US00RE48785E

(19) United States
(12) Reissued Patent
Yamamoto

(10) Patent Number: US RE48,785 E
(45) Date of Reissued Patent: Oct. 26, 2021

(54) INK JET RECORDER

(71) Applicant: Duplo Corporation, Kanagawa (JP)

(72) Inventor: Shuhei Yamamoto, Kanagawa (JP)

(73) Assignee: DUPLO CORPORATION, Kanagawa (JP)

(21) Appl. No.: 16/156,767

(22) Filed: Oct. 10, 2018

Related U.S. Patent Documents

Reissue of:
(64) Patent No.: 9,463,652
Issued: Oct. 11, 2011
Appl. No.: 14/923,462
Filed: Oct. 27, 2015

(30) Foreign Application Priority Data

Oct. 28, 2014 (JP) ..... 2014-219496

(51) Int. Cl.
*B41J 2/21* (2006.01)
*B41J 13/26* (2006.01)
(Continued)

(52) U.S. Cl.
CPC ..... *B41J 2/2114* (2013.01); *B41J 2/04505* (2013.01); *B41J 2/04558* (2013.01); *B41J 2/04573* (2013.01); *B41J 2/2135* (2013.01); *B41J 2/2146* (2013.01); *B41J 3/407* (2013.01); *B41J 11/002* (2013.01); *B41J 11/46* (2013.01);
(Continued)

(58) Field of Classification Search
CPC .... B41J 2/04573; B41J 2/04558; B41J 11/46; B41J 13/26; B41J 3/407; B41J 2/04505; B41J 2/2114; B41J 2/2146; B41J 11/003
See application file for complete search history.

(56) References Cited

U.S. PATENT DOCUMENTS 4,250,806 A 2/1981 Boyson et al.
4,401,024 A 8/1983 Frentress
(Continued)

FOREIGN PATENT DOCUMENTS

JP 2009/255572 A 5/2009
WO 2005/066881 7/2005
(Continued)

OTHER PUBLICATIONS

Extended European Search Report dated Apr. 24, 2018, issued in counterpart EP application 18160585.8 (9 pages).
(Continued)

*Primary Examiner* — Minh Nguyen
(74) *Attorney, Agent, or Firm* — Westerman, Hattori, Daniels & Adrian, LLP

(57) ABSTRACT

On a sheet of paper on which an image has already been formed, a first registration mark pair and a second registration mark pair are printed. The first registration mark pair and second registration mark pair each consist of a pair of registration marks that are arranged to be spaced apart in a paper-width direction, the second registration mark pair located posterior to the first registration mark pair in the paper-conveying direction. Based on the actual positional relationship between the first registration mark pair and the second registration mark pair that are read by a reading unit, a correction unit corrects discharge data that corresponds to an image formation area located between the first registration mark pair and the second registration mark pair.

22 Claims, 15 Drawing Sheets

(51) Int. Cl.

| | |
|---|---|
| ***B41J 2/045*** | (2006.01) |
| ***B41J 11/00*** | (2006.01) |
| ***B41J 11/46*** | (2006.01) |
| ***B41J 3/407*** | (2006.01) |

(52) U.S. Cl.
CPC ..... *B41J 13/26* (2013.01); *B41J 11/00214* (2021.01)

(56) References Cited

U.S. PATENT DOCUMENTS

| | | | | |
|---|---|---|---|---|
| 4,857,715 | A | 8/1989 | Koch et al. | |
| 5,864,774 | A | 1/1999 | Jones | |
| 6,160,633 | A | 12/2000 | Mori | |
| 6,255,665 | B1 | 7/2001 | Elgee et al. | |
| 6,325,480 | B1 | 12/2001 | Moghadam et al. | |
| 6,331,038 | B1 | 12/2001 | Boleda et al. | |
| 6,411,324 | B1 | 6/2002 | Christiansen et al. | |
| 6,412,907 | B1 | 7/2002 | Castelli et al. | |
| 6,454,383 | B2 | 9/2002 | Lund et al. | |
| 6,493,083 | B2 | 12/2002 | Parisi et al. | |
| 6,568,782 | B1 | 5/2003 | Haselby | |
| 6,644,764 | B2 | 11/2003 | Stephens, Jr. | |
| 8,172,351 | B2 | 5/2012 | Kaieda et al. | |
| 9,802,425 | B2 * | 10/2017 | Seki | B41J 2/21 |
| 2002/0113968 | A1 | 8/2002 | Parisi et al. | |
| 2002/0126173 | A1 | 9/2002 | Sarmast et al. | |
| 2002/0140757 | A1 | 10/2002 | Tullis et al. | |
| 2003/0107640 | A1 | 6/2003 | Chang et al. | |
| 2003/0133000 | A1 | 7/2003 | Conrow et al. | |
| 2003/0189610 | A1 | 10/2003 | Darby et al. | |
| 2004/0196325 | A1 | 10/2004 | Castano et al. | |
| 2005/0175386 | A1 | 8/2005 | Romine | |
| 2005/0206980 | A1 | 9/2005 | Nishikawa et al. | |
| 2005/0264596 | A1 | 12/2005 | Little | |
| 2012/0219340 | A1 * | 8/2012 | Rumsby | B23K 26/0846 400/76 |

FOREIGN PATENT DOCUMENTS

| | | | |
|---|---|---|---|
| WO | 2005/066881 | A1 | 7/2005 |
| WO | 2009/047757 | A2 | 4/2009 |

OTHER PUBLICATIONS

International Search Report of PCT/IL2008/001323 (WO 2009/047757 A3), dated Mar. 9, 2009.

Supplementary European Search Report of EP 2209648 A4 (Application No. EP 08 80 8120), completion of search date Nov. 18, 2011.

Non-Final Rejection of U.S. Appl. No. 12/682,163 (US 2011/219974), notification date Mar. 13, 2014.

European Search Report in European Patent Application No. EP15191917 issued Aug. 4, 2016.

* cited by examiner

INK JET RECORDER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a reissue application of U.S. Pat. No. 9,463,652 issued on Oct. 11, 2016 which issued from U.S. application Ser. No. 14,923,462 filed on Oct. 27, 2015 which claims priority to Japan Patent Application No. 2014-219496 filed Oct. 28, 2014.*

BACKGROUND OF THE INVENTION

1. Field of the Invention

The present invention relates to an inkjet recorder and particularly to technology for further reapplying ink (for example, ultraviolet curable ink) to a paper surface on which an image is formed by digital printing, offset printing, etc.

2. Description of the Related Art

Technology referred to as so-called overcoating is a known ink jet recorder printing technology. In overcoating, a sheet of paper on which an image has been formed beforehand is thickened around the, e.g., text of the image, the sheet of paper is made to be partially glossy, a three-dimensional impression is made on the sheet of paper, and/or a complicated color expression is achieved by printing one color on top of another on the sheet of paper. For example, a transparent ink is printed over a base print so as to produce a three-dimensional effect, or ink that is different in color and in property is overprinted in accordance with the color of a printed image serving as the base print so as to darken the printing color or to express color that cannot be expressed by only carrying out printing once. As an example of this, there is a case where, for example, after an image is formed on a paper surface by digital printing, offset printing, etc., an ultraviolet curable ink (hereinafter, referred to as "UV ink") is applied in a thick layer over the image, and an ultraviolet ray is radiated so as to cure the ink (spot UV printing) (see, for example, Japanese Patent Application Publication No. 2009-255572). In order to produce a three-dimensional effect using a printed image that serves as a base print, a transparent UV ink is widely used as an UV ink.

Overcoating is performed for the purpose of, e.g., decorating an image on a sheet of paper that has already been printed. Thus, an ink layer for the overcoating needs to be accurately formed at the position matching up with the printed image. Therefore, conventionally, a mark (hereinafter, referred to as a "registration mark") for positioning is printed, in advance, at the periphery of a printing area at an end portion of a sheet of paper, and the position of a printed image may be identified with reference to the position of the registration mark. From this, a position may be set for discharging ink for the overcoating. Even when there is a misalignment in the printed image, the discharge position is corrected with reference to the position of the registration mark. More specifically, a technique has been employed where a pair of registration marks is printed along the width of the front end of a paper surface in the direction of conveyance of the sheet of paper.

SUMMARY OF THE INVENTION

According to the above-described technique, with reference to a pair of registration marks printed at the front end of a sheet of paper, the timing of the ink discharge may be corrected for the overcoating on a printed image located downstream from the registration marks along the direction of conveyance of the sheet of paper (also known as "the paper-conveying direction", which will hereafter be applied as a condition). For example, if the pair of registration marks is misaligned with each other, the sheet of paper is considered to be skewed, and the ink discharge timing for the overcoating is corrected. However, with this kind of technique, proper correction cannot be made when there is distortion in the printed image since the distortion cannot be detected. Further, the distortion in the printed image may be erroneously determined to be caused by skewing. In that case, a problem arises where the correction causes misalignment along the width of the sheet of paper, as the formation of an ink layer for overcoating progresses.

The present invention seeks, in part, to highly accurately form an ink layer for overcoating even when there is distortion in a printed image serving as a base print. An ink jet recorder that is capable of performing an overcoating process is sought to form said ink layer with high accuracy.

One embodiment of the present invention relates to an ink jet recorder configured to perform an overcoating process, where an ultraviolet curable overcoating ink is discharged onto a sheet of paper on which a registration mark that serves as a reference for identifying an image formation position is printed and on which an image has already been formed, such that the overcoating is superimposed on the image. The ink jet recorder includes: a conveying mechanism that conveys the sheet of paper on which the image has already been formed; a recording head that functions to discharge the overcoating ink onto a printing surface of the sheet of paper, on which the image has already been formed; an ultraviolet-ray irradiation unit that is arranged downstream of the recording head in a paper-conveying direction and that cures, by irradiating with an ultraviolet ray, the overcoating ink on the sheet of paper; a reader that is arranged upstream, in the paper conveying direction, of the recording head and that reads the registration mark printed on the sheet of paper that is conveyed; a memory unit that stores data that is set in advance, based on a design correspondence relationship, between a printing position of the registration mark and the image formation position in the sheet of paper, wherein the data is discharge data for identifying a discharge pattern of the overcoating ink discharged from the recording head; a controller that performs the discharge control of the recording head based on the discharge data; and a correction unit that corrects the discharge data based on information read for the registration mark.

On the sheet of paper on which the image has already been formed, a first registration mark pair and a second registration mark pair are printed. The first registration mark pair and second registration mark pair each consist of a pair of registration marks that are arranged to be spaced apart in a paper-width direction, perpendicular to the paper-conveying direction, the second registration mark pair located posterior to the first registration mark pair in the paper-conveying direction. Based on the actual positional relationship between the first registration mark pair and the second registration mark pair that are read by the reading unit, the correction unit corrects discharge data that corresponds to an image formation area located between the first registration mark pair and the second registration mark pair.

Optional combinations of the aforementioned constituting elements and implementations of the invention in the form of methods, apparatuses, or systems may also be practiced as additional modes of the present invention.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention but to exemplify the invention. The size of the component in each figure may be changed in order to aid understanding. Some of the components in each figure may be omitted if they are not important for explanation.

In the following explanation, an explanation will be given regarding spot UV printing as an example of overcoating. Further, in the following explanation, it will be assumed unless otherwise stated that printing occurs along the direction of conveyance of the sheet of paper. The upstream side along the direction of conveyance in an ink jet recorder may be simply referred to as "upstream" or "upstream side," and the downstream side along the direction of conveyance may be simply referred to as "downstream" or "downstream side," for convenience sake.

Figure 1:
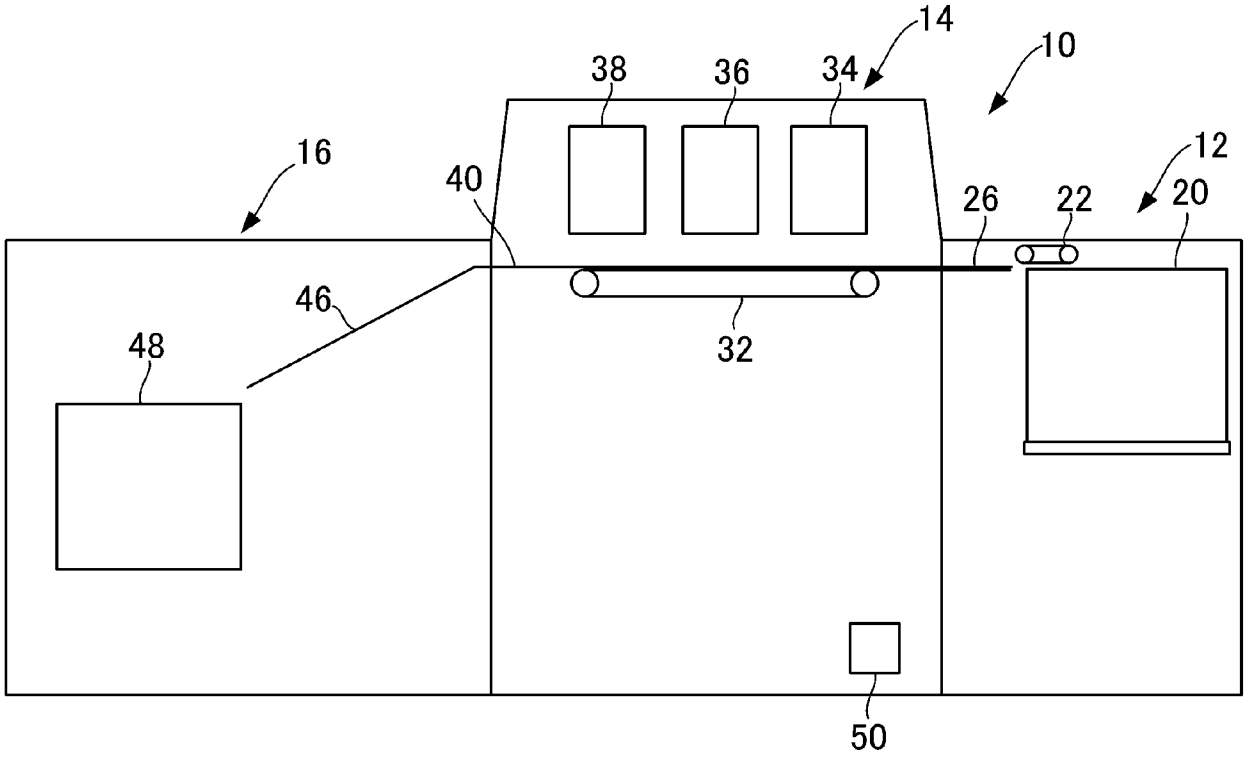
FIG. 1 is a diagram schematically illustrating an ink jet recorder according to an embodiment.

FIG. 1 is a diagram schematically illustrating an ink jet recorder 10 according to an embodiment. The ink jet recorder 10 performs a spot UV printing process where a UV ink layer is formed on a sheet of paper, on which an image has already been formed by printing. The UV ink layer is formed such that it is superimposed on the printed image.

The ink jet recorder 10 is provided with a paper feeder 12, an image recorder 14, and a stacker 16. The paper feeder 12 has a paper feeding table 20 and a paper feeding mechanism 22. In the paper feeding table 20, image-formed sheets of paper (hereinafter also known as "sheets" or "paper") are loaded. On each sheet, a predetermined image has been printed by another ink jet recorder (not shown). The paper feeding table 20 is formed to be liftable, and the topmost sheet of the loaded paper is fed by the paper feeding mechanism 22.

The sheet of paper that has been sent out by the paper feeding mechanism 22 is conveyed along a conveying path 26. The image recorder 14 is provided downstream from the conveying path 26. In the image recorder 14, a belt conveying mechanism 32 is provided, which conveys the sheet of paper along the conveying path 26. The belt conveying mechanism 32 conveys the sheet of paper while allowing the sheet of paper to stick to a conveying surface by air suction power through holes that are formed on a belt. Above the belt conveying mechanism 32, an image reader 34, a head unit 36, and an ultraviolet-ray irradiation apparatus 38 are provided in order upstream in the paper-conveying direction.

A discharging path 40 is connected downstream from the image recorder 14. The sheet of paper that has been conveyed from the belt conveying mechanism 32 is sent to the discharging path 40 and then transported to the stacker 16. The stacker 16 has a conveying path 46 and a sheet accumulator 48. The sheet of paper transported through the discharging path 40 is discharged and accumulated in the sheet accumulator 48 via the conveying path 46. In an exemplary variation, a printer may be directly connected instead of the paper feeder 12. Instead of the stacker 16, an apparatus may be connected that performs a post-treatment process such as cutting and/or binding a sheet of paper that is sent out.

The ink jet recorder 10 also has an electronic control unit 50 (also known as an "electronic control 50"). The electronic control unit 50 has a dedicated CPU for performing various operations related to the embodiments, a ROM for storing various control programs, and a RAM used as a work area to store data and execute programs. The electronic control unit 50 controls a spot UV printing process on a sheet of paper, on which an image has already been formed, by controlling, for example, the operation of an actuator provided inside the ink jet recorder 10. An operation panel (not shown) is provided in the ink jet recorder 10, and a user is able to set various settings for the spot UV printing process by operation input via this operation panel. In an exemplary variation, a display, a mouse, and a keyboard of an external PC may function as the operation panel, and the PC may function as the electronic control unit 50.

Figure 2A:
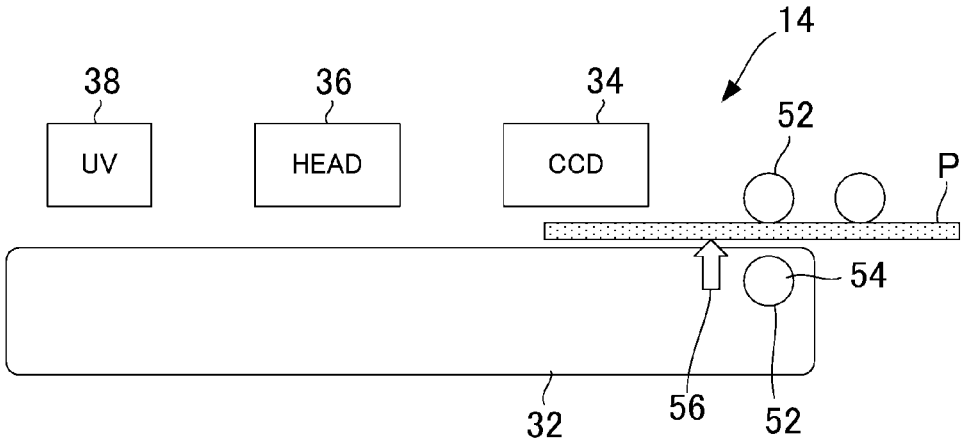
FIGS. 2A and 2B are diagrams schematically illustrating the details of main parts of an image recorder.
Figure 2B:
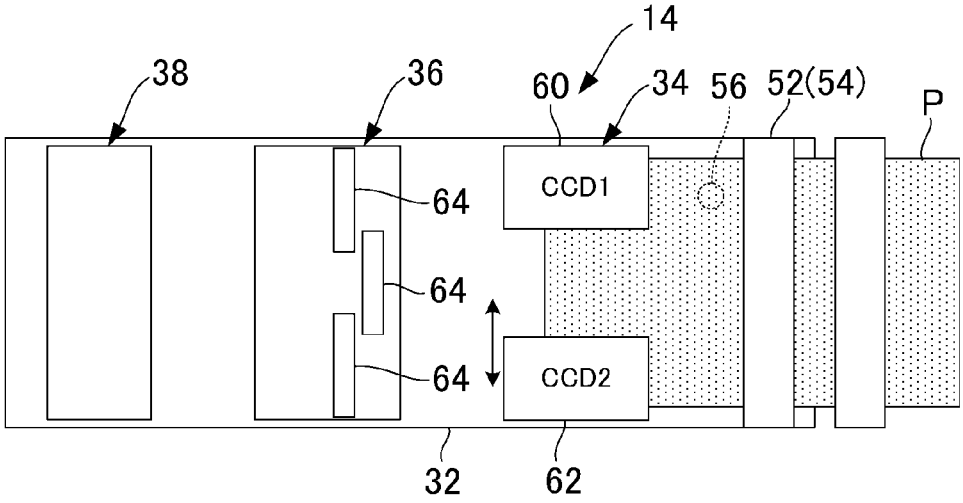

FIG. 2 is a diagram schematically illustrating the details of main parts of the image recorder 14. FIG. 2A is a side view, and FIG. 2B is a plan view. As shown in FIG. 2A, the image recorder 14 is provided with a plurality of conveyance rollers 52 that convey a sheet of paper P as the belt conveying mechanism 32. This sheet of paper P is an image-formed sheet of paper on which an image subject to spot UV printing (hereinafter, also referred to as a "base image") and a registration mark that serves as a reference for identifying an image formation position of the base image are printed. For one driving roller located upstream of the image reader 34 among the plurality of conveyance rollers 52, an encoder 54 (rotary encoder) is installed for calculating the conveyance amount of the sheet of paper P based on the number of rotations thereof. A sheet sensor 56 for detecting a front end of the sheet of paper P that has been conveyed from the paper feeder 12 is arranged between the image reader 34 and the encoder 54.

Triggered by the detection of the sheet of paper P by the sheet sensor 56, the electronic control unit 50 acquires an output pulse of the encoder 54 and calculates the conveyance position of the sheet of paper P. Then, based on the position of the sheet of paper P that has been calculated, the electronic control unit 50 sets the image timing for imaging by the image reader 34, discharge timing of a UV ink by the head unit 36, and ultraviolet-ray irradiation timing for ultraviolet-ray irradiation by the ultraviolet-ray irradiation apparatus 38. Details of this control will be described later.

As shown in FIG. 2B, the image reader 34 includes a pair of image sensors 60 and 62 arranged spaced apart along the width of the sheet of paper above the belt conveying mechanism 32. In the present embodiment, these image sensors 60 and 62 are formed of charged coupled devices (CCD). Alternatively, complementary metal oxide semiconductors (CMOS) or other image sensors may be employed. The image sensor 60 is formed as a first sensor that is fixed along the width of one end side of the sheet of paper. The image sensor 62 is provided along the width of the other end side of the sheet of paper and is formed as a second sensor that is provided movably along the width of the sheet of paper. In other words, an interval between the pair of image sensors can be adjusted by driving the image sensor 62 along the width of the sheet of paper according to the size of the sheet of paper P.

The head unit 36 has three line heads 64 that discharge a UV ink such that the UV ink is superimposed on an image that has been printed on the sheet of paper P conveyed upstream. These line heads 64 function as "recording heads." A UV ink is ink that contains components (ultraviolet curable components such as monomers, oligomers, etc.) that become cured (polymerized) by the application of ultraviolet energy and a photopolymerization initiator. This UV ink has properties of initiating polymerization upon receiving an ultraviolet ray, increasing in the viscosity thereof as the polymerization progresses, and becoming cured in the course of time.

Each of the line heads 64 has a number of discharge holes (nozzles) arranged linearly in the longitudinal direction thereof for the discharging of UV ink. In each of the three line heads 64, the nozzles are arranged in a direction (hereinafter, referred to as a "paper-width direction") that is perpendicular to the paper-conveying direction, and the line heads 64 are disposed in an overlapped manner such that no gap is created between adjacent line heads 64.

In an exemplary variation, a plurality of line heads 64 other than three line heads may be provided. Alternatively, the line heads 64 may be formed of a long single object in the paper-width direction. Further, the line heads 64 may be arranged such that respective nozzles are lined up in a predetermined direction that is not parallel to the paper-conveying direction; for example, the respective nozzles may be arranged being inclined at a predetermined angle with respect to the paper-width direction. Further, recording heads that discharge ink into two or more lines at once may be used as the line heads 64.

The ultraviolet-ray irradiation apparatus 38 functions as a "ultraviolet-ray irradiation unit" and cures, by irradiating a UV ink formed on the sheet of paper P conveyed upstream with an ultraviolet ray, a UV ink layer of the UV ink.

Figure 3:
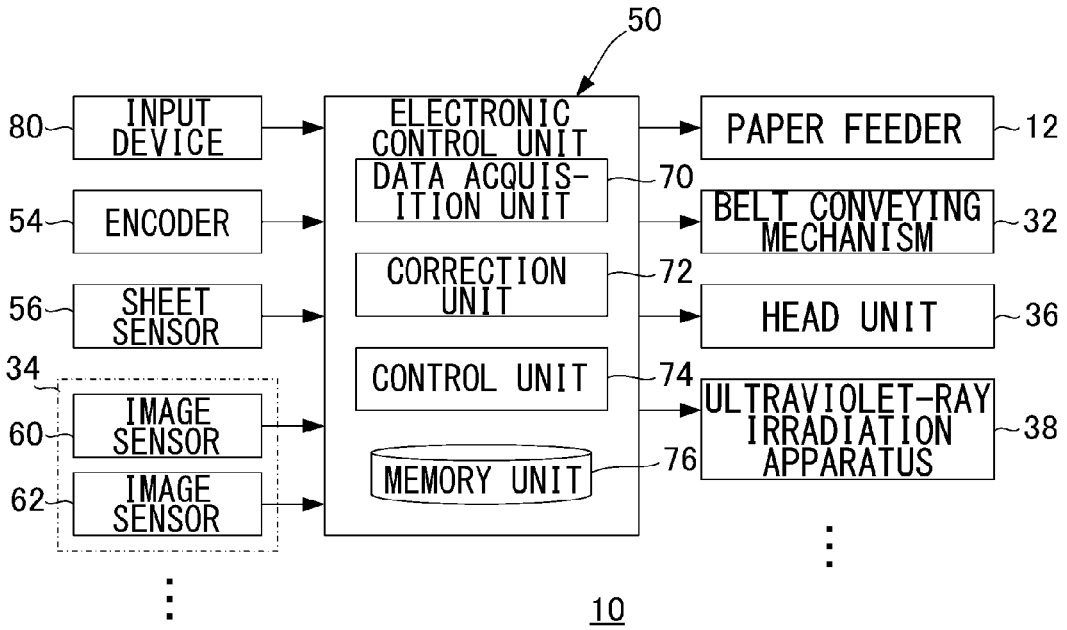
FIG. 3 is a schematic view illustrating an electrical configuration focusing on an electronic control unit of the ink jet recorder.

FIG. 3 is a schematic view illustrating an electrical configuration, focusing on the electronic control unit 50 of the ink jet recorder 10. Functional blocks are shown for the electronic control unit 50. The functions of these are implemented by the cooperation of hardware such as a dedicated CPU for performing various operations, a ROM for storing various control programs, and a RAM used as a work area to store data and execute programs, and software. Therefore, these functional blocks may be implemented in a variety of forms by combinations of hardware and software.

The electronic control unit 50 has a data acquisition unit 70, a correction unit 72, a control unit 74 (otherwise known as a "controller 74"), and a memory unit 76. An electronic signal from an input device 80 provided at an operational panel (not shown) is input to the electronic control unit 50. This input device 80 includes various switches such as a start switch for starting a spot UV printing process, a stop switch for stopping the spot UV printing process, etc. Detection signals from the encoder 54, the sheet sensor 56, the image sensors 60 and 62, which have already been explained, and the like are input to the electronic control unit 50. Based on input from these switches and sensors, the electronic control unit 50 performs a predetermined operation for paper-feeding control, conveyance control, discharge control for a UV ink, ultraviolet-ray irradiation control, etc., and outputs a control command signal to the paper feeder 12, the belt conveying mechanism 32, the head unit 36, the ultraviolet-ray irradiation apparatus 38, and the like.

The memory unit 76 of the electronic control unit 50 is a memory storage that stores discharge data for identifying a discharge pattern of a UV ink from the headunit 36. This discharge data is data that is set in advance based on a correspondence relationship between a printing position of a plurality of registration marks printed on the sheet of paper P and an image formation position in the sheet of paper P and is print data used for the printing of a base image. The data acquisition unit 70 acquires this discharge data by connecting with an external terminal, such as a personal computer (not shown), or a storage device, such as a USB memory.

The correction unit 72 reads out the discharge data from the memory unit 76 and corrects the discharge data based on position information (design position) of the registration marks included in the discharge data and the actual position information (measured position) of the registration marks read out by the image reader 34. In other words, if the base image printed on the sheet of paper P deviates from a design value or if the sheet of paper P conveyed upstream is tilted, an accurate spot UV printing process along the actual base image cannot be performed by discharge control based on the discharge data stored in the memory unit 76. Therefore, the correction unit 72 calculates the difference between the design value and the measured value of the base image based on the change in the position of the registration marks. The correction unit 72 performs a correction process for covering the difference on the discharge data. The control unit 74 performs the discharge control of the UV ink based on the discharge data, as corrected. Details of this correction process will be described later.

Figure 4A:
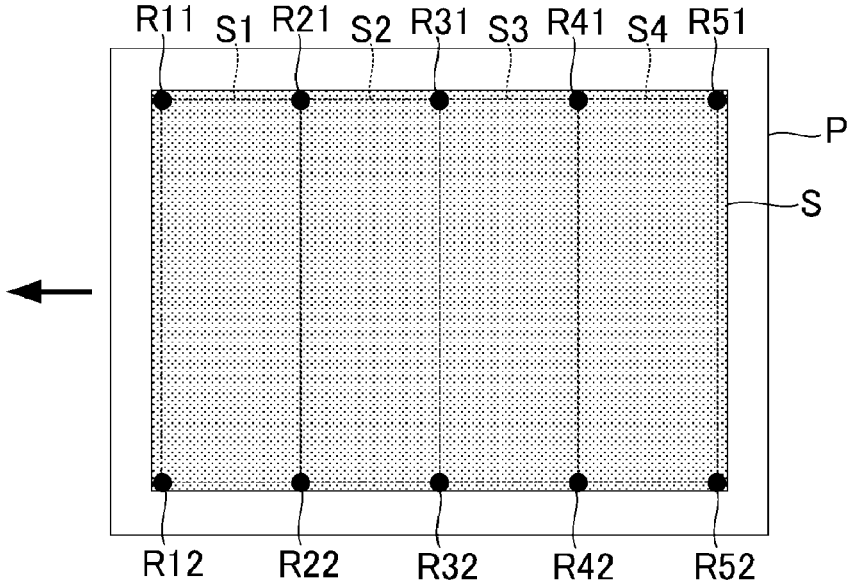
FIGS. 4A and 4B are diagrams each illustrating a coordinate system that is set for discharge control of a UV ink.
Figure 4B:
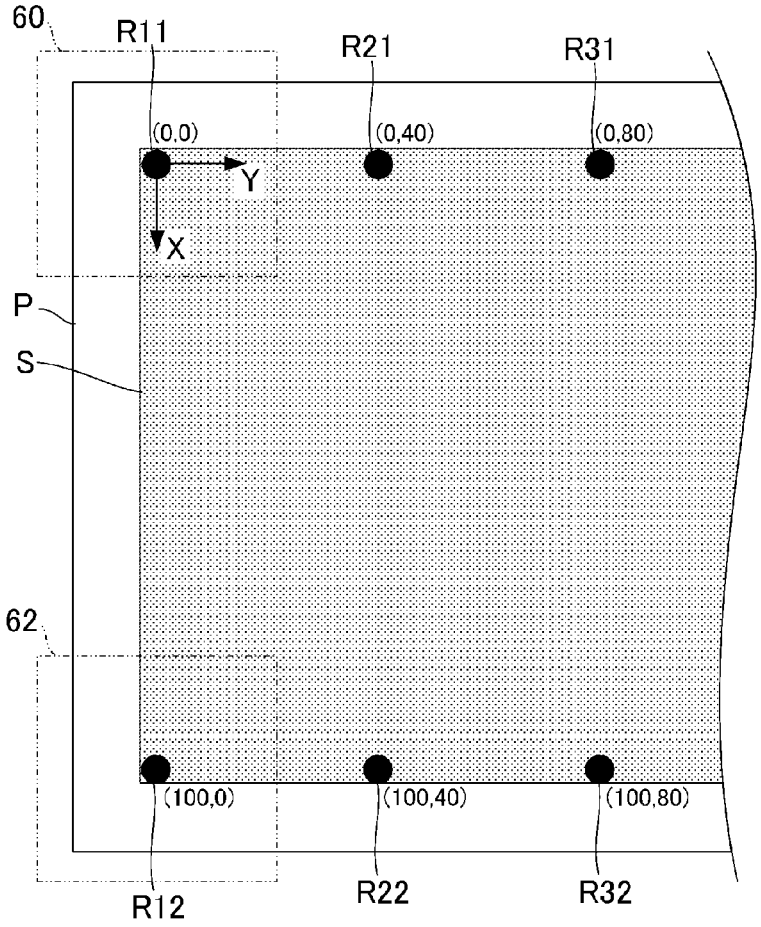

An explanation will now be given in detail regarding the spot UV printing process according to the present embodiment. FIGS. 4A and 4B are diagrams each illustrating a coordinate system that is set for the discharge control of the UV ink. FIGS. 5-12 are explanatory diagrams showing a method of correcting discharge data. In the figures, each (A) figure shows a situation regarding a deviation between a design value and a measured value of a base image, and each (B) figure shows a method of correcting the deviation.

As shown in FIG. 4A, a rectangular image formation area S for printing a base image is set on the sheet of paper P. In a printing process that is performed before a spot UV printing process, a base image is printed in this image formation area S. Also, a plurality of registration marks that serve as references, respectively, for identifying an image formation position of the base image are printed in the image formation area S. In other words, the registration marks are printed in pairs of registration marks R11 and R12, registration marks R21 and R22, registration marks R31 and R32, and so on, in the paper-width direction, from the front end of the sheet of paper Pin the paper-conveying direction (see a solid arrow in the figure). For the sake of ease of explanation, registration marks Rn1 and Rn2 (n is an integer) that are paired up are expressed as a registration mark pair Rn (n is an integer) appropriately in the following. In the present embodiment, there are five registration mark pairs. However, the set number of the registration mark pairs can be changed appropriately.

In each of the registration mark pairs, one registration mark is printed on one end portion in the paper-width direction in the image formation area S, and the other registration mark is printed on the other end portion in the paper-width direction. In terms of design, two registration marks that constitute a registration pair are set such that the respective positions of the registration marks in the paper-conveying direction are the same. The plurality of registration mark pairs are printed at even intervals in the paper-conveying direction. The image formation area S is subdivided into a plurality of image formation areas Sn (n is an integer) by registration mark pairs located in front (front registration mark pairs) in the paper-conveying direction and registration mark pairs located in back (rear registration mark pairs) in the paper-conveying direction. In other words, an image formation area S1, an image formation area S2, an image formation area S3, and an image formation area S4 are formed between registration mark pairs R1 and R2, registration mark pairs R2 and R3, registration mark pairs R3 and R4, and registration mark pairs R4 and R5, respectively.

The size of each of the image formation areas in a Y direction, i.e., an interval in the Y direction between a front registration mark pair and a rear registration mark pair in the paper-conveying direction, is set to be smaller than an interval between the image sensors 60 and 62 and the line heads 64 in the paper-conveying direction. In other words, the line heads 64 and the image sensors 60 and 62 are arranged such that the line heads 64 and the image sensors 60 and 62 are spaced apart at an interval that is greater than or equal to an interval between registration marks that constitute a front registration mark pair and registration marks that constitute a rear registration mark pair, in the paper-conveying direction. With this, starting of the discharge control of a UV ink before the completion of a correction process for discharge data that is performed for each image formation area is prevented for the same image formation area.

As shown in FIG. 4B, as a coordinate system in the present embodiment, the center position for imaging of the image sensor 60 is set to be the point of origin (0, 0), and the X axis and Y axis of the Cartesian coordinate system are set for the paper-width direction and the paper-conveying direction, respectively. The direction toward the image sensor 62 from the image sensor 60 is set to be the positive-X direction, and the direction toward the back in the paper-conveying direction is set to be a positive-Y direction. This coordinate is set in accordance with the image resolution of the base image, and a coordinate in the X direction corresponds to the number of dots of the resolution (the number of nozzles of the line heads 64). A coordinate in the Y direction corresponds to the number of lines that corresponds to a paper feeding amount for each discharge. Therefore, detailed coordinates are actually set. However, in order to simplify the explanation, coordinates at the center position for imaging of the image sensor 62 are assumed to be at (100, 0).

When a base image is printed according to a design value and the sheet of paper P is conveyed in a normal way, coordinates are set such that the coordinates of a registration mark R12 become (100, 0), the coordinates of a registration mark R21 become (0, 40), the coordinates of a registration mark R22 become (100, 40), the coordinates of a registration mark R31 become (0, 80), and the coordinates of a registration mark R32 become (100, 80) when a registration mark R11 reaches the point of origin (0, 0), as shown in the Figure. In other words, the coordinates are set such that a distance between a pair of registration marks becomes 100 in the X direction, and an interval between a front registration mark pair and a rear registration mark pair becomes 40 in the Y direction.

In such a configuration, if the base image is not printed according to the design value or the sheet of paper P is not conveyed in a normal way due to the sheet of paper P being set at an angle or the like, the above-described coordinates cannot be obtained for the registration mark pairs, and the base image deviates from the design value. In the present embodiment, this deviation is calculated for each image formation area at the time of a spot UV printing process, and a discharge pattern according to discharge data that corresponds to the deviation is corrected. Then, by performing the discharge control of the UV ink in accordance with the discharge data as corrected, a highly-accurate spot UV printing process in accordance with the actual condition of the base image can be realized.

In this correction, the position (measured position) of each registration mark imaged by the image sensors 60 and 62 is acquired, and the difference between the measured position and a design value (reference position) is calculated. Image timing by the image sensors 60 and 62 is set by the number of output pulses of the encoder 54, which is counted being triggered by the detection of a front end of the sheet of paper P by the sheet sensor 56. This image timing is set such that each registration mark pair falls within an imaging range by the image sensors 60 and 62. In the same way, discharge timing from each nozzle of the head unit 36 and ultraviolet-ray irradiation timing by the ultraviolet-ray irradiation apparatus 38 are also set by the number of output pulses of the encoder 54, triggered by the detection of the front end of the sheet of paper P. An explanation will be given in the following regarding a specific method of correcting discharge data.

Figure 5A:
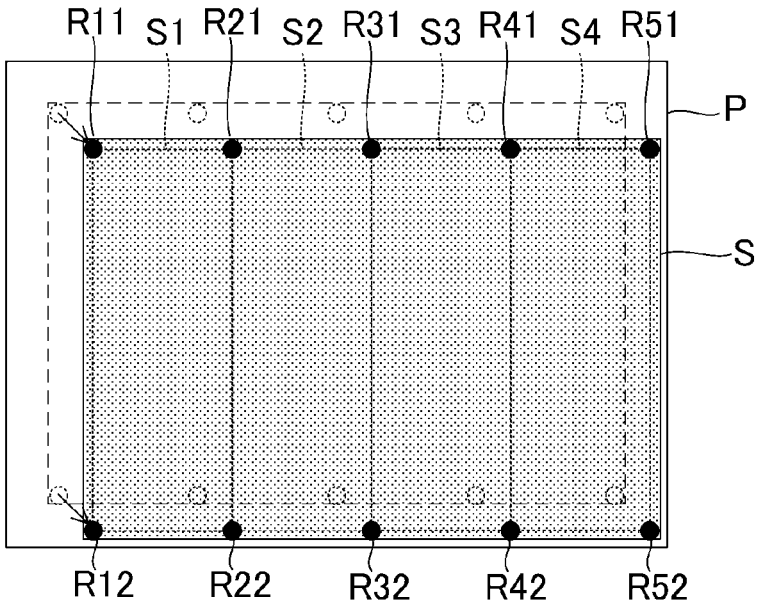
FIGS. 5A and 5B are explanatory diagrams showing a method of correcting discharge data.
Figure 5B:
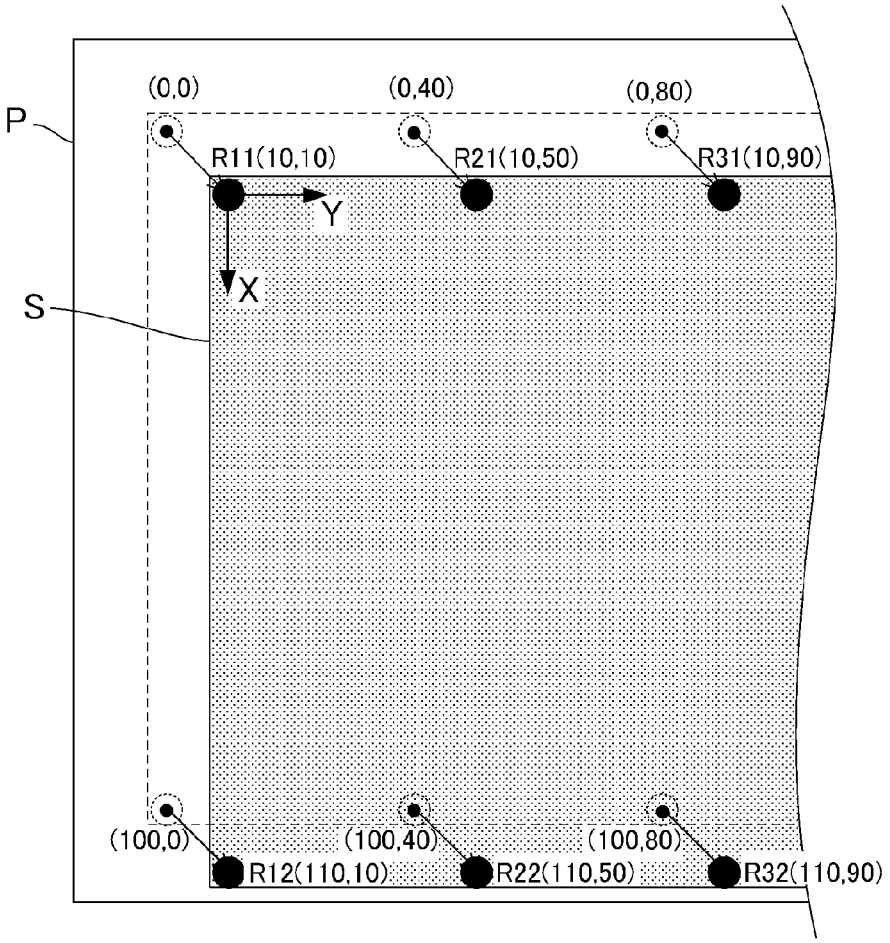

FIG. 5A shows a case where the base image is offset in the X direction and in the Y direction with respect to the design value. More specifically, as shown in FIG. 5B, each registration mark is parallel shifted by ten (10) dots in the X direction and by ten (10) lines in the Y direction. The fact that the base image is offset in this manner can be determined based on position information of two registration mark pairs, one front registration mark pair and one rear registration mark pair in the paper-conveying direction, that form each image formation area, i.e., the position information of four registration marks. When it is determined through calculation that the four registration marks are displaced in the X direction and in the Y direction by the same value, it is determined that there is such an offset.

In such a case, correction according to the parallel shift is also made for the discharge data. In other words, a correction of shifting the discharge position of the UV ink by ten (10) dots in the X direction and delaying the discharge timing by ten (10) lines in the Y direction is made on the discharge data, serving as the design value that is read out from the memory unit 76. This number of lines in the Y direction is associated with the number of output pulses of the encoder 54. By such correction, a highly-accurate spot UV printing process can be also realized even when the base image is offset.

Figure 6A:
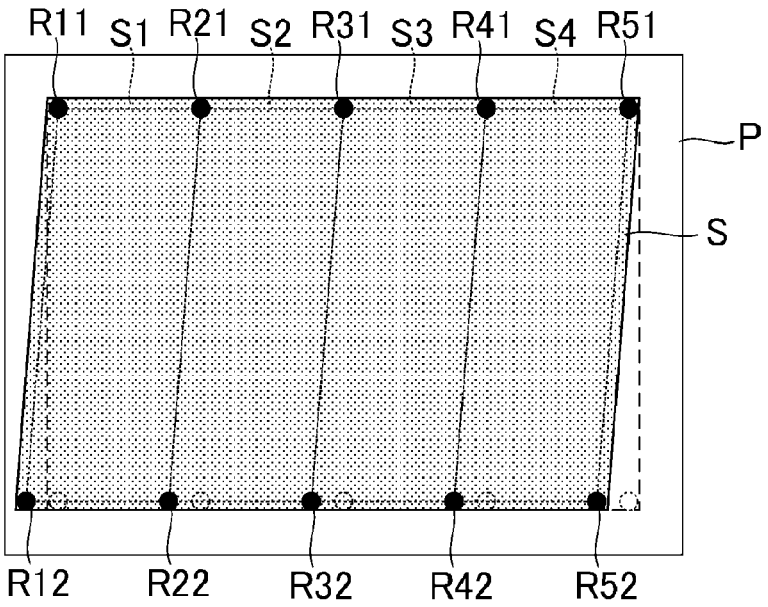
FIGS. 6A and 6B are explanatory diagrams showing a method of correcting discharge data.
Figure 6B:
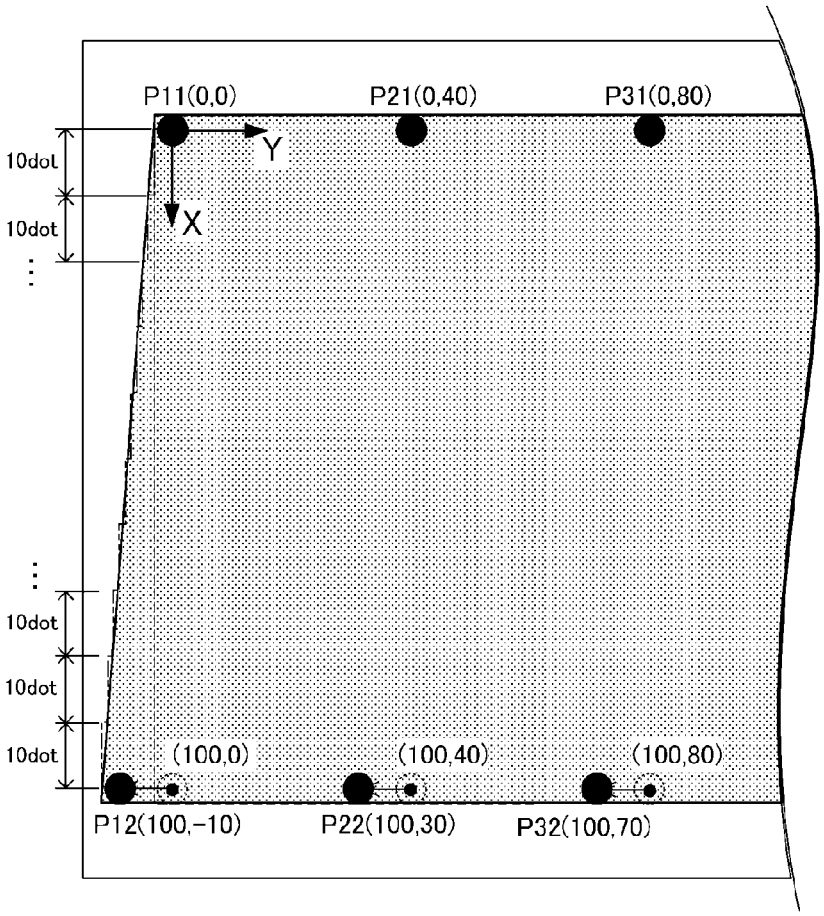

FIG. 6A shows a case where the base image is deformed (twisted) parallel to the paper-conveying direction with respect to the design value. More specifically, as shown in FIG. 6B, registration marks on one side in the paper-width direction are parallel shifted by −10 lines in the Y direction. The fact that the base image is twisted in this manner can be also determined based on position information of two registration mark pairs, one front registration mark pair and one rear registration mark pair in the paper-conveying direction, that form each image formation area. It is determined that the base image is twisted when the X coordinate of each registration mark does not change and relative displacement in the Y direction of two registration marks that constitute a front registration mark pair matches relative displacement in the Y direction of two registration marks that constitute a rear registration mark pair.

In such a case, correction according to the parallel shift is also made for the discharge data. In other words, a correction of advancing the discharge timing of a UV ink as the X coordinates become larger is made on the discharge data, serving as the design value that is read out from the memory unit 76. More specifically, the discharge timing is advanced by one line at a time in the Y direction for every ten (10) dots in the X direction from the point of origin (0, 0), which is the position of the registration mark R11. The position of the registration mark R12 is at a line −10 in the Y direction, and the start of the discharge process is advanced by ten (10) lines. By such correction, a highly-accurate spot UV printing process can be also realized even when the base image is twisted.

Figure 7A:
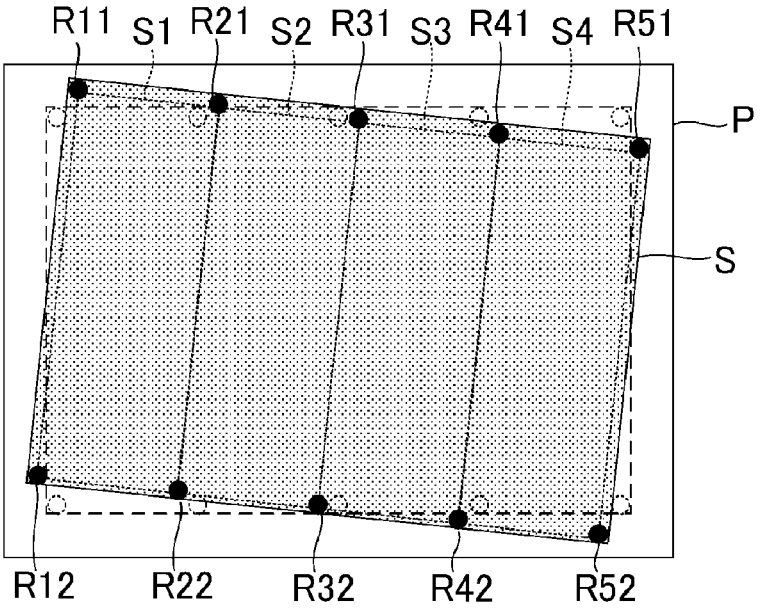
FIGS. 7A and 7B are explanatory diagrams showing a method of correcting discharge data.
Figure 7B:
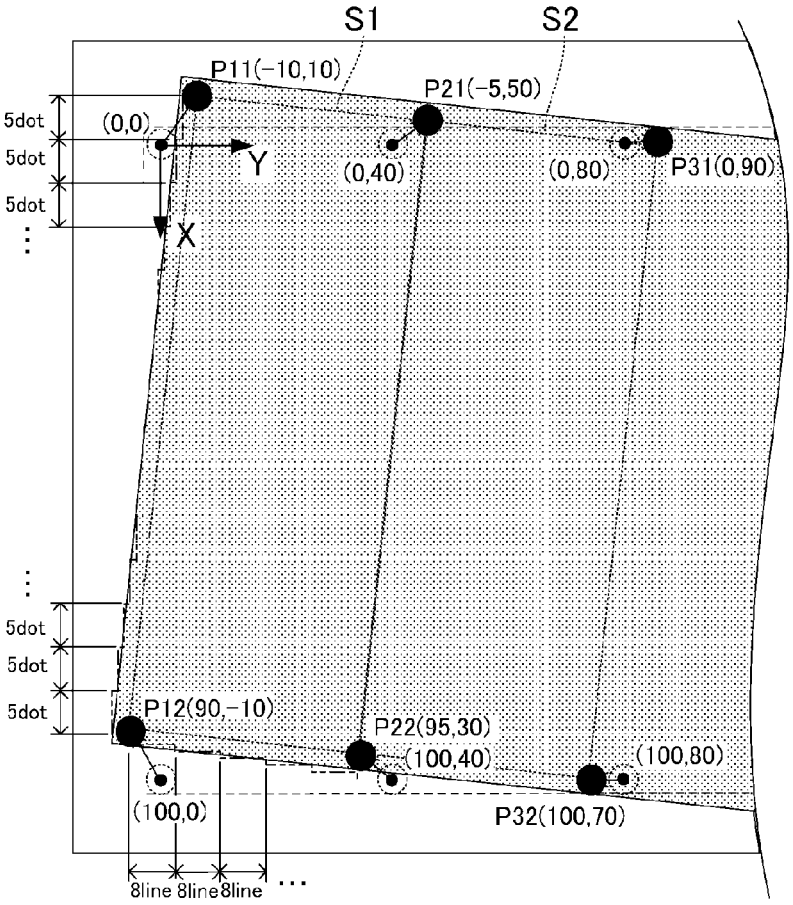

FIG. 7A shows a case where the base image is deformed (skewed) in the X direction and in the Y direction with respect to the design value. More specifically, as shown in FIG. 7B, with regard to an image formation area S1, the registration mark R11 is displaced by negative ten (−10) dots in the X direction and by ten (10) lines in the Y direction. The registration mark R12 is displaced by negative ten (−10) dots in the X direction and by negative ten (−10) lines in the Y direction. The registration mark R21 is displaced by negative five (−5) dots in the X direction and by ten (10) lines in the Y direction. The registration mark R22 is displaced by negative five (−5) dots in the X direction and by negative ten (−10) lines in the Y direction. Based on the displacement of these four registration marks, the deformation of the image formation area S1 and, furthermore, the average amount of deformation of the base image within the image formation area S1 are calculated, and discharge data for the corresponding area is corrected.

In other words, after making a correction of shifting the point of origin (0, 0) of the base image to a measured position (−10, 10) of the registration mark R11, a correction of delaying the discharge timing of the UV ink as an X coordinate becomes smaller in a range where the X coordinate is small and advancing the discharge timing of the UV ink as an X coordinate becomes larger in a range where the X coordinate is large is made on the discharge data serving as the design value that is read out from the memory unit 76. More specifically, the discharge timing is set to advance by one line at a time in the Y direction for every five dots in the X direction from the measured position (−10, 10) of the registration mark R11. The position of the registration mark R12 is at negative ten (−10) lines in the Y direction, and the start of the discharge process is advanced by ten (10) lines. The position of the registration mark R11 is at negative ten (−10) lines in the Y direction, and the start of the discharge process is delayed by ten (10) lines. At the same time, the discharge position is set to be shifted by one (1) dot at a time in the X direction for every eight (8) lines advanced in the Y direction. The same correction is also performed for image formation areas S2 through S4 according to the coordinates of a front registration mark pair and the coordinates of a rear registration mark pair in the respective paper-conveying directions. By such correction, a highly-accurate spot UV printing process can be also realized even when the base image is skewed.

Figure 8A:
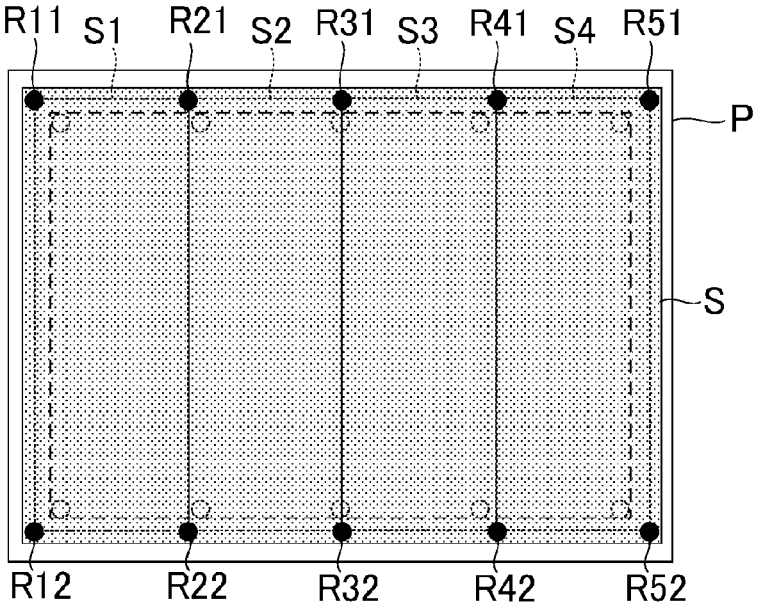
FIGS. 8A and 8B are explanatory diagrams showing a method of correcting discharge data.
Figure 8B:
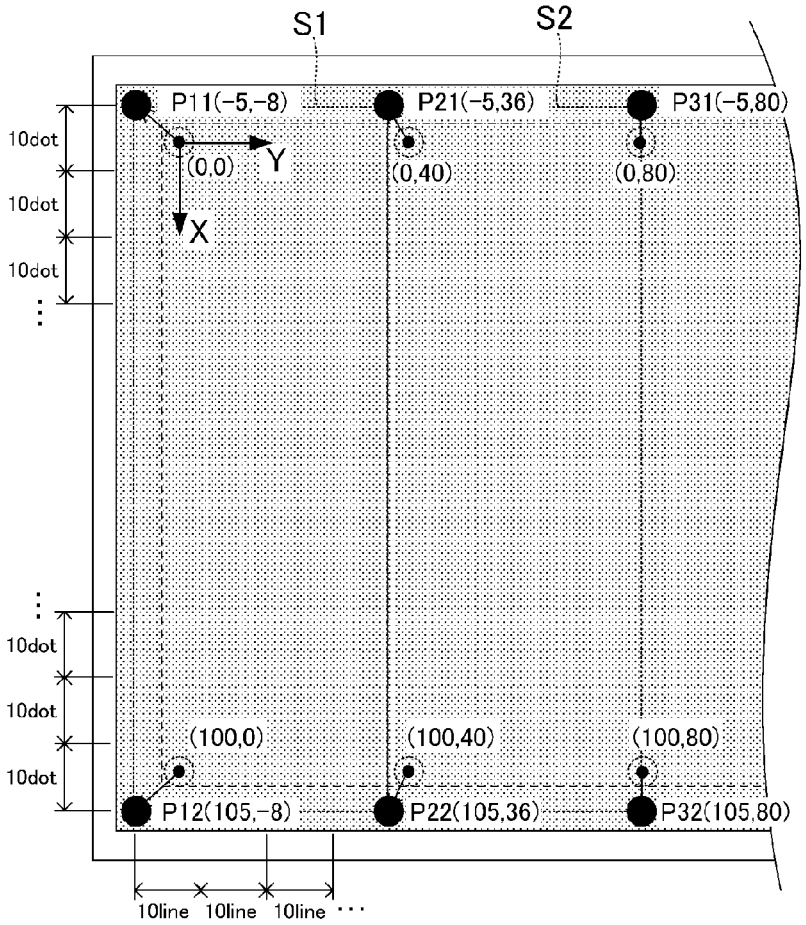

FIG. 8A shows a case where the base image is enlarged in the X direction and in the Y direction with respect to the design value. More specifically, as shown in FIG. 8B, with regard to an image formation area S1, the registration mark R11 is displaced by negative five (−5) dots in the X direction and by negative eight (−8) lines in the Y direction. The registration mark R12 is displaced by five (5) dots in the X direction and by negative eight (−8) lines in the Y direction. The registration mark R21 is displaced by negative five (−5) dots in the X direction and by negative four (−4) lines in the Y direction. The registration mark R22 is displaced by five (5) dots in the X direction and by negative four (−4) lines in the Y direction. Based on the displacement of these four registration marks, the magnification ratio and deformation of the image formation area S1 can be calculated. Based on the magnification ratio and the amount of the deformation, the average amount of deformation of the base image within the image formation area S1 is calculated, and discharge data for the corresponding area is corrected.

In other words, based on these coordinates, the image formation area S1 is found to be enlarged by 10% in each direction of the X direction and the Y direction. Thus, after making a correction of shifting the point of origin (0, 0) of the base image to a measured position (−5, −8) of the registration mark R11, a correction of displacing the discharge position of the UV ink by one dot for every ten dots positively in the X direction and displacing the discharge position by one line for every ten lines positively in the Y direction is made on the discharge data serving as the design value that is read out from the memory unit 76. The same correction is also performed for image formation areas S2 through S4 according to the coordinates of a front registration mark pair and the coordinates of a rear registration mark pair in the respective paper-conveying directions. By such correction, a highly-accurate spot UV printing process can be also realized even when the base image is enlarged.

Figure 9A:
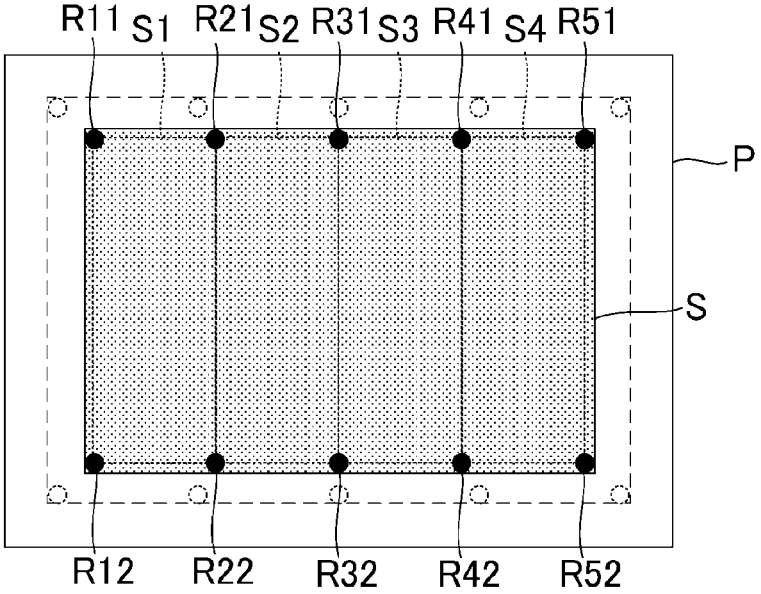
FIGS. 9A and 9B are explanatory diagrams showing a method of correcting discharge data.
Figure 9B:
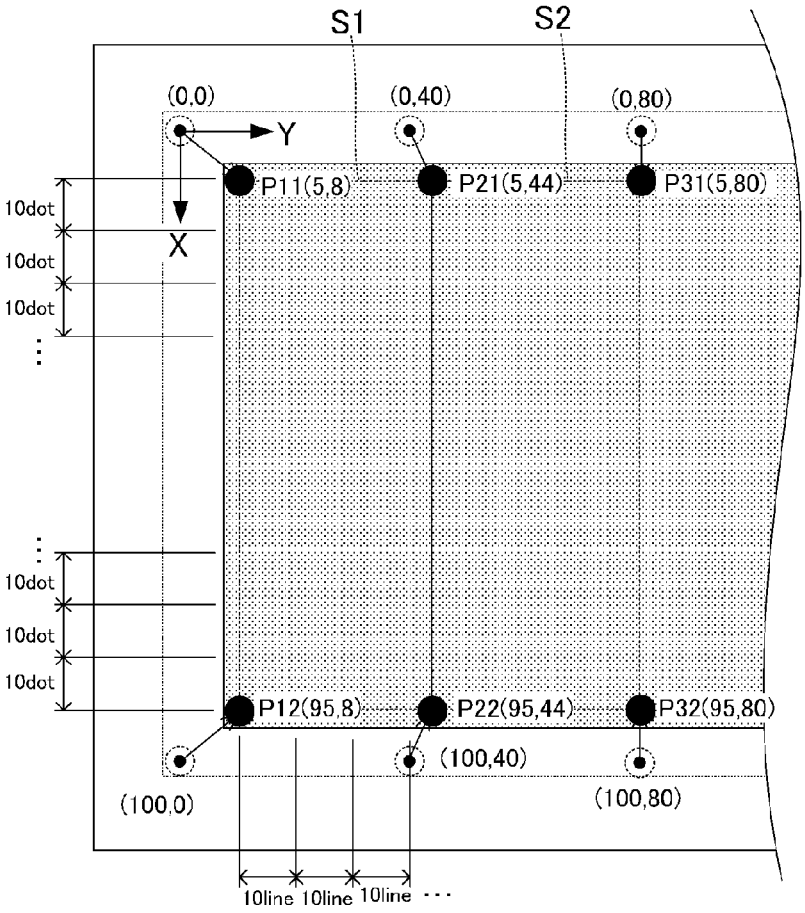

FIG. 9A shows a case where the base image is reduced in the X direction and in the Y direction with respect to the design value. More specifically, as shown in FIG. 9B, with regard to an image formation area S1, the registration mark R11 is displaced by five (5) dots in the X direction and by eight (8) lines in the Y direction. The registration mark R12 is displaced by negative five (−5) dots in the X direction and by eight (8) lines in the Y direction. The registration mark R21 is displaced by five (5) dots in the X direction and by four (4) lines in the Y direction. The registration mark R22 is displaced by negative five (−5) dots in the X direction and by four (4) lines in the Y direction. Based on the displacement of these four registration marks, the reduction ratio and deformation of the image formation area S1 can be calculated. Based on the reduction ratio and the amount of the deformation, the average amount of deformation of the base image within the image formation area S1 is calculated, and discharge data for the corresponding area is corrected.

In other words, based on these coordinates, the image formation area S1 is found to be reduced by 10% in each direction of the X direction and the Y direction. Thus, after making a correction of shifting the point of origin (0, 0) of the base image to a measured position (5, 8) of the registration mark R11, a correction of displacing the discharge position of the UV ink negatively by one dot for every ten dots in the X direction and displacing the discharge position negatively by one (1) line for every ten (10) lines in the Y direction is made on the discharge data serving as the design value that is read out from the memory unit 76. The same correction is also performed for image formation areas S2 through S4 according to the coordinates of a front registration mark pair and the coordinates of a rear registration mark pair in the respective paper-conveying directions. By such correction, a highly-accurate spot UV printing process can be also realized even when the base image is reduced.

Figure 10A:
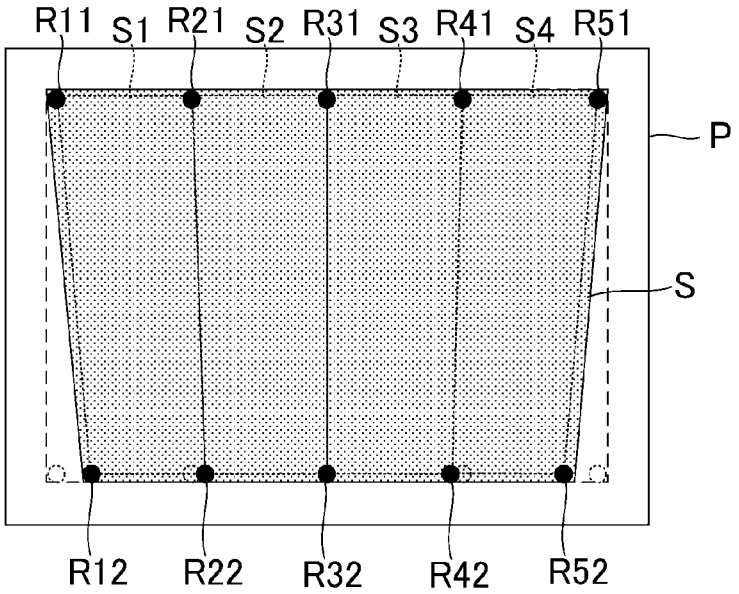
FIGS. 10A and 10B are explanatory diagrams showing a method of correcting discharge data.
Figure 10B:
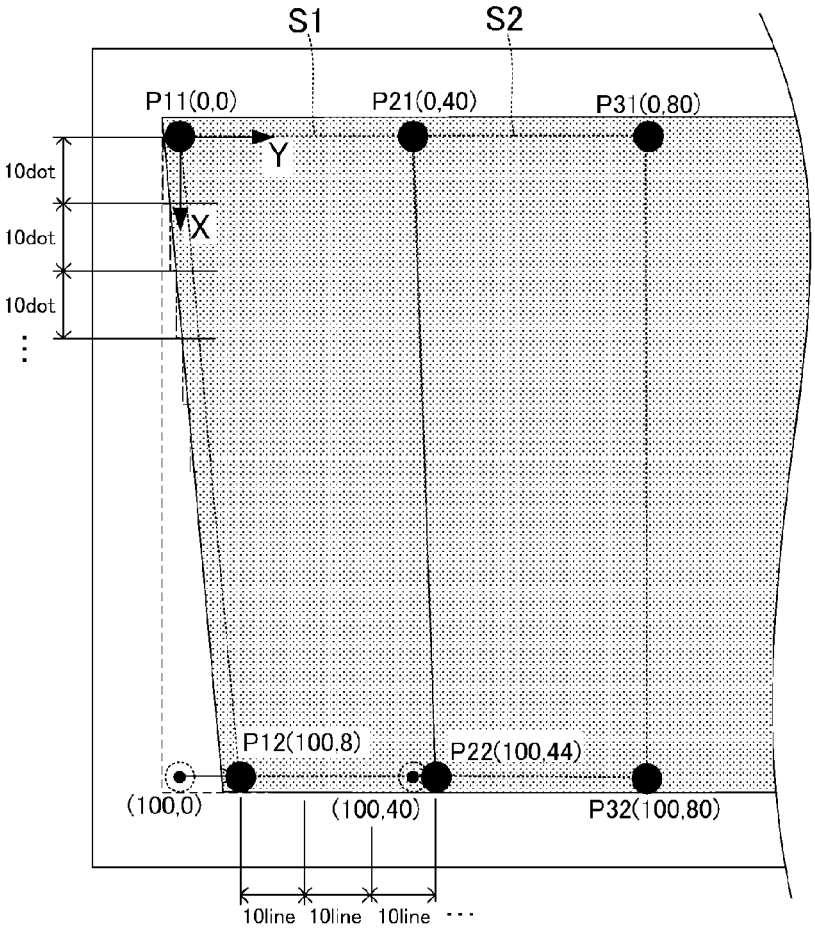

FIG. 10A shows an example of a case where the base image is distorted in a trapezoidal shape with respect to the design value. More specifically, as shown in FIG. 10B, the base image is reduced on one side in the paper-width direction. More specifically, with regard to an image formation area S1, the registration marks R11 and R21 are not displaced, the registration mark R12 is displaced by eight lines in the Y direction, and the registration mark R22 is displaced by four (4) lines in the Y direction. Based on the displacement of these four registration marks, the deformation of the image formation area S1 can be calculated. Based on the amount of the deformation, the average amount of deformation of the base image within the image formation area S1 is calculated, and discharge data for the corresponding area is corrected.

In other words, based on these coordinates, the image formation area S1 is found to be reduced by 10% in the Y direction on one side in the paper-width direction. Thus, for the discharge data serving as the design value that is read out from the memory unit 76, the discharge timing of the UV ink is delayed by one line for every ten dots in the X direction with reference to the point of origin (0, 0) of the base image. At a position where an X coordinate is at zero (0) 0, the discharge position in the Y direction is not negatively displaced. At a position where an X coordinate is at 100, the discharge position is displaced negatively by one (1) line for every ten (10) lines in the Y direction. Ata position where an X coordinate is larger than zero (0) and smaller than 100, the discharge position is negatively displaced in a linear manner. More specifically, a line interval is reduced such that the discharge position is displaced negatively in the Y direction by one (1) line for every increase of ten (10) in the X coordinate. The same correction is also performed for image formation areas S2 through S4 according to the coordinates of respective front registration mark pairs and the coordinates of respective rear registration mark pairs in the paper-conveying direction. By such correction, a highly-accurate spot UV printing process can be also realized even when the base image is reduced on one side in the paper-width direction.

Figure 11A:
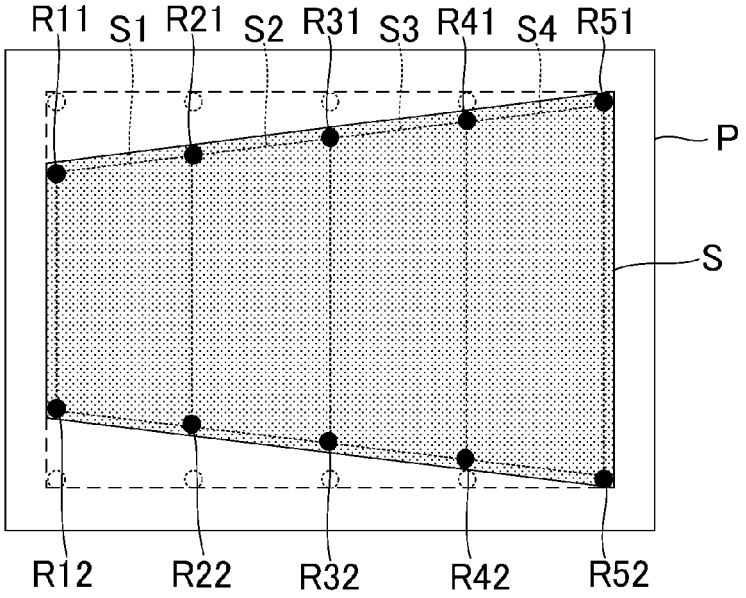
FIGS. 11A and 11B are explanatory diagrams showing a method of correcting discharge data.
Figure 11B:
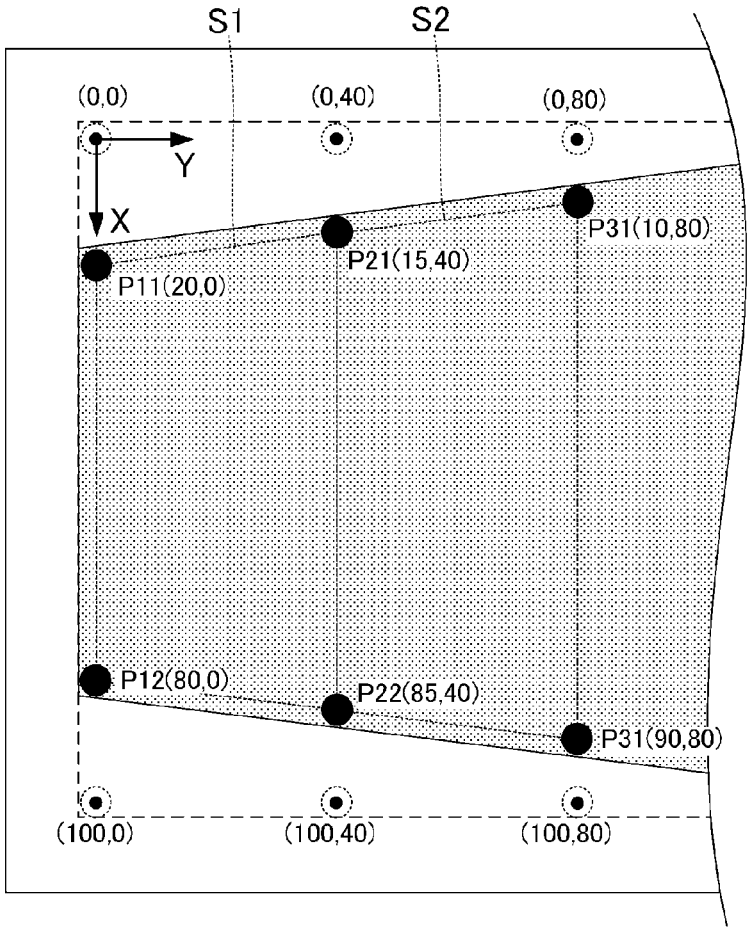

FIG. 11A shows another example of a case where the base image is distorted in a trapezoidal shape with respect to the design value. More specifically, as shown in FIG. 11B, the base image is reduced on one side in the paper-conveying direction. More specifically, with regard to an image formation area S1, the registration mark R11 is displaced by twenty (20) dots in the X direction, and the registration mark R12 is displaced by negative twenty (−20) dots in the X direction. The registration mark R21 is displaced by fifteen (15) dots in the X direction, and the registration mark R22 is displaced by negative fifteen (15) dots in the X direction. Based on the displacement of these four registration marks, the deformation of the image formation area S1 can be calculated. Based on the amount of the deformation, the average amount of deformation of the base image within the image formation area S1 is calculated, and discharge data for the corresponding area is corrected.

In other words, based on these coordinates, the image formation area S1 is found to be reduced by 40% in the X direction on one side in the paper-conveying direction. Thus, after making a correction of shifting the point of origin (0, 0) of the base image to a measured position (20, 0) of the registration mark R11 to the discharge data serving as the design value that is read out from the memory unit 76, the discharge position of the UV ink is displaced negatively by two dots for every five dots in the X direction on a line where the Y coordinate at the position of the registration mark R11 is at zero (0). Further, on a line where the Y coordinate at the position of the registration mark R21 is forty (40), the discharge position of the UV ink is displaced negatively by three (3) dots for every ten (10) dots in the X direction after shifting a discharge starting position in the X direction by negative five (−5). Ata position where a Y coordinate is larger than zero (0) and smaller than forty (40), the discharge position is positively displaced in a linear-function manner after shifting the discharge position by negative one (−1) for every eight (8) lines in the Y direction. The same correction is also performed for image formation areas S2 through S4 according to the coordinates of respective front registration mark pairs and the coordinates of respective rear registration mark pairs in the paper-conveying direction. By such correction, a highly-accurate spot UV printing process can be also realized even when the base image is reduced on one side in the paper-conveying direction.

Figure 12A:
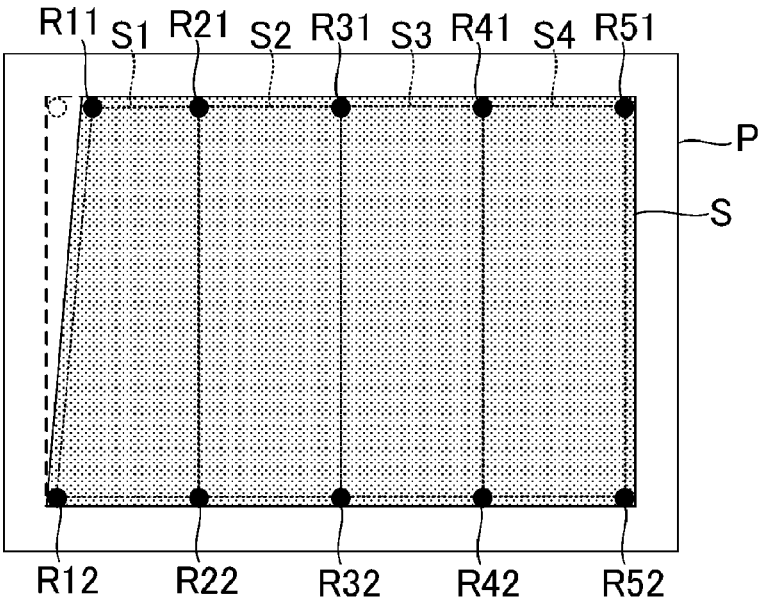
FIGS. 12A and 12B are explanatory diagrams showing a method of correcting discharge data.
Figure 12B:
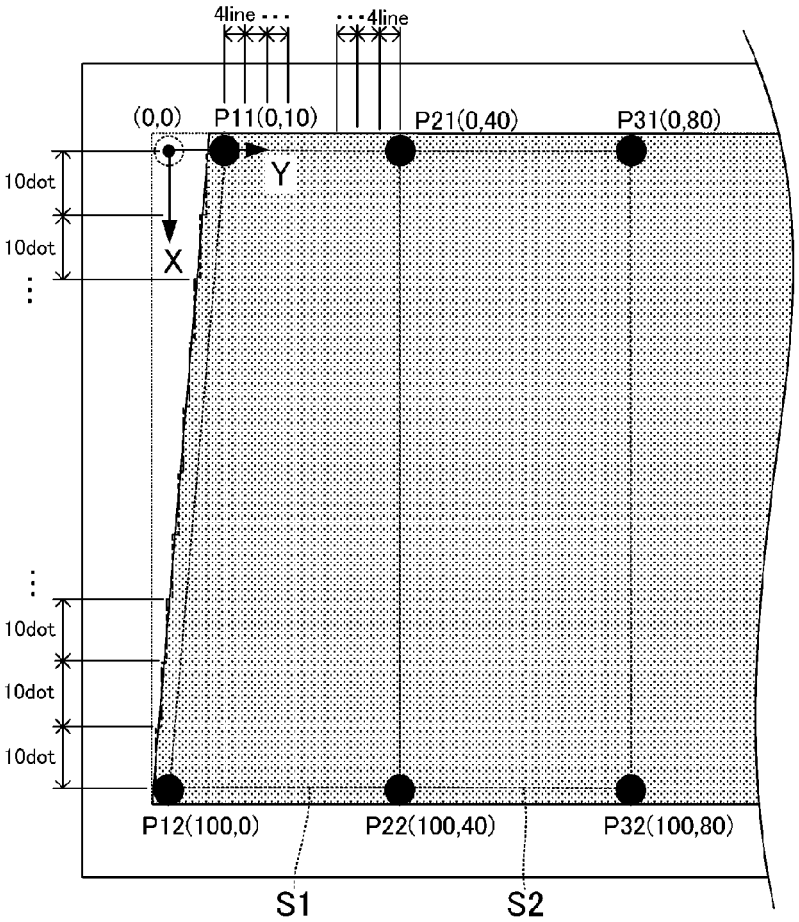

FIG. 12A shows a case where a specific image formation area of the base image is distorted with respect to the design value. More specifically, as shown in FIG. 12B, only an image formation area S1 of the base image is reduced on one side in the paper-conveying direction. More specifically, with regard to the image formation area S1, the registration mark R11 is displaced by ten (10) lines in the Y direction. Other registration marks R12, R21, and R22 are as specified by respective design values. Based on the displacement of these four registration marks, the deformation of the image formation area S1 can be calculated. Based on the amount of the deformation, the average amount of deformation of the base image within the image formation area S1 is calculated, and discharge data for the corresponding area is corrected.

In other words, based on these coordinates, the image formation area S1 is found to be reduced by 25% in the Y direction on one side in the paper-conveying direction. Thus, for the discharge data serving as the design value that is read out from the memory unit 76, the discharge timing of the UV ink is delayed by one line for every negative ten (−10) dots in the X direction with reference to the position (100, 0) of the registration mark R12 of the base image. At a position where an X coordinate is 100, the discharge position in the Y direction is not negatively displaced. At a position where an X coordinate is at zero (0), the discharge position is displaced negatively by one (1) line for every four (4) lines in the Y direction. At a position where an X coordinate is smaller than 100 and larger than zero (0), the discharge position is negatively displaced in a linear-function manner. More specifically, a line interval is reduced such that the discharge position is displaced negatively in the Y direction by one line for every decrease of ten (10) in the X coordinate. There is no distortion in image formation areas S2 through S4. Thus, correction is not necessary, and the discharge data according to the design value is directly used. By such a process, a highly-accurate spot UV printing process can be also realized even when the base image is deformed in a specific image formation area, i.e., when the distortion is not even and exists in a portion of the image.

Figure 13:
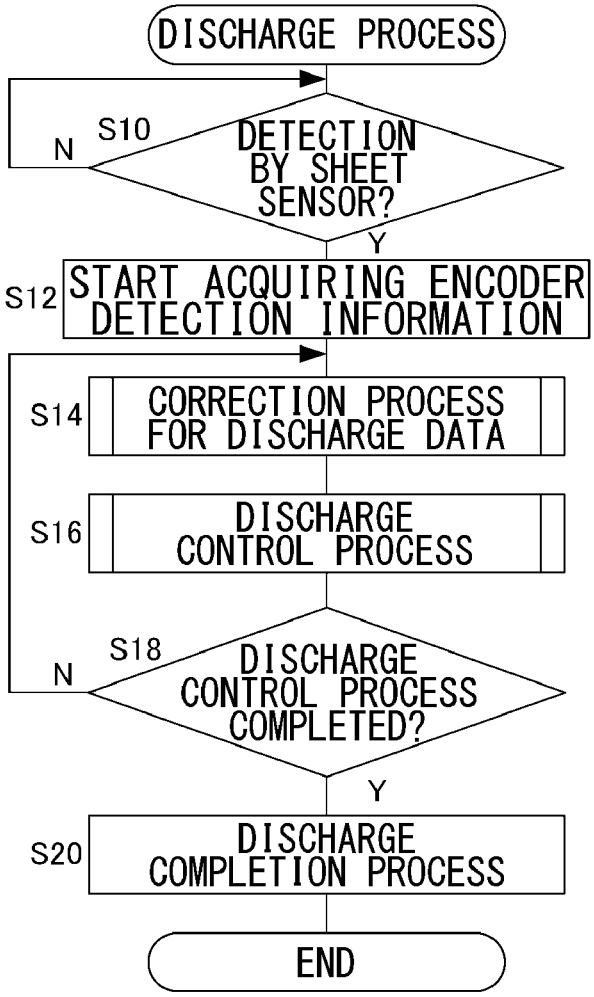
FIG. 13 is a flowchart illustrating a discharge process of a UV ink that is performed by the electronic control unit.

An explanation will now be given regarding the flow of specific processes performed in the present embodiment. FIG. 13 is a flowchart illustrating a discharge process of a UV ink that is performed by the electronic control unit 50. This process is performed when a spot UV printing process is started by operation input by the user via the input device 80. Before this process, an already-printed sheet of paper P subject to spot UV printing is set on the paper feeding table 20, and discharge data used for the printing of the sheet of paper P is stored in the memory unit 76.

When paper feeding is performed by the paper feeder 12 and the front end of the sheet of paper P is detected by the sheet sensor 56 (Y in S10), the data acquisition unit 70 acquires position information of the sheet of paper P based on detection information according to the encoder 54 (S12). Subsequently, the correction unit 72 performs a correction process for the discharge data (S14), and the control unit 74 performs a discharge control process of the UV ink based on the discharge data as corrected (S16). These correction and discharge control processes are performed for each image formation area. Thus, until the processes are completed for all image formation areas of the sheet of paper P, the processes shown in S14 and S16 are repeated (N in S18). Then, when the processes are completed for all the image formation areas (Y in S18), the control unit 74 performs a discharge completion process that is preset (S20) so as to end the process for the moment.

Figure 14:
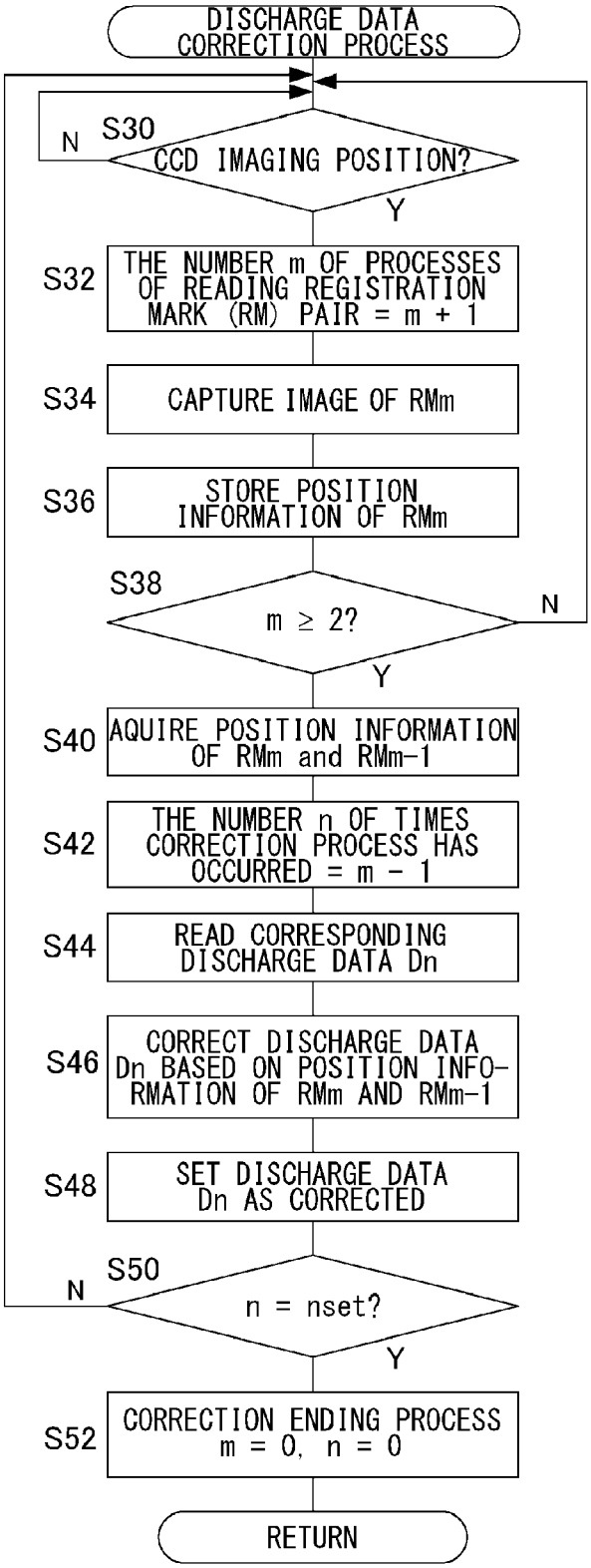
FIG. 14 is a flowchart illustrating a discharge data correction process in S14 shown in FIG. 13 in detail.

FIG. 14 is a flowchart illustrating a discharge data correction process in S14 shown in FIG. 13 in detail. When the correction unit 72 determines based on the detection information according to the encoder 54 that the sheet of paper P has reached a position at which imaging is performed by the image sensor 60 (Y in S30), the correction unit 72 increments the number m of processes of reading a registration mark pair by one (S32). The initial value of m is set to be zero, and m becomes "1" when the first treatment is performed. Then, the correction unit 72 allows an m-th registration pair from the head of the sheet of paper in the paper-conveying direction to be imaged by the image sensors 60 and 62 (S34) and stores position information of the registration pair in a predetermined area in the RAM (S36). For the sake of ease of explanation, a registration mark is often expressed as "RM", and an m-th registration mark pair is often expressed as "RMm" in the embodiment.

If the registration mark pair is imaged for the first time (m=1) at this time (N in S38), the step goes back to S30. On the other hand, if the number of times of the imaging of the registration mark pair is two or more (m≥2) (Y in S38), the correction unit 72 reads out position information of four registration marks that constitute registration mark pair imaged this time and registration mark pair imaged last time (S40). In other words, the correction process is skipped if the registration mark pair is imaged for the first time since the correction process is performed using four registration marks that constitute front and rear registration mark pairs.

Then, the correction unit 72 updates the number n of times the correction process has occurred as follows: n=m−1 (S42). The initial value of the number n of times the correction process has occurred is set to be zero. This shows, for example, regarding a sheet of paper P that the first correction process (n=1) is performed when a second registration mark pair (m=2) from the head of the sheet of paper is read. In other words, the number n of times the correction process has occurred and the number m of times the reading of a registration mark pair has occurred are associated with each other. Then, the correction unit 72 reads discharge data Dn that corresponds to an image formation area at this time (i.e., n-th image formation area) from the memory unit 76 (S44). Then, based on the position information of the four registration marks that constitute the m-th registration mark pair RMn and an (m−1)th registration mark pair RMm−1, the correction unit 72 corrects the discharge data Dn so as to set the discharge data Dn as corrected. This correction process is as explained in association with FIGS. 5-11.

The correction unit 72 repeats the processes in S30 through S48 until the number n of times the correction process has occurred reaches a set number of times nset at this time (N in S50). The set number of times, nset, corresponds to the number of image formation areas and is nset=4 in the present embodiment. When the number n of times the correction process has occurred reaches the set number of times nset (Y in S50), the correction unit 72 performs a correction ending process of, e.g., clearing the number m of times the reading process has occurred and the number n of times the correction process has occurred to zero (S52) so as to end the process for the moment.

Figure 15:
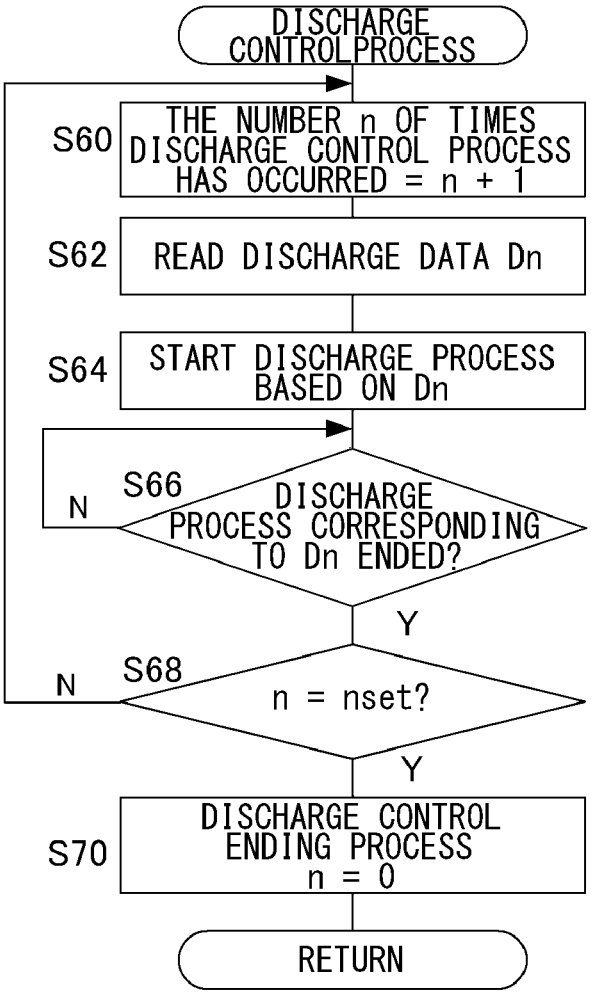
FIG. 15 is a flowchart illustrating a discharge control process in S16 shown in FIG. 13 in detail.

FIG. 15 is a flowchart illustrating a discharge control process in S16 shown in FIG. 13 in detail. After incrementing the number n of times the discharge control process has occurred by one (S60), the control unit 74 reads the discharge data Dn as corrected (discharge data for a single image formation area) (S62). Driving the head unit 36, the control unit 74 starts a discharge process based on the discharge data Dn (S64). The number n of times the discharge control process has occurred corresponds to the number n of times the correction process has occurred, and these processes are repeated until the number n of times the discharge control process has occurred reaches a set number of times nset (N in S68). When the discharge process based on the discharge data Dn is ended (Y in S66) and the number n of times the discharge control process has occurred reaches the set number of times nset (Y in S68), the control unit 74 performs a discharge control ending process of, e.g., clearing the number n of times the discharge control process has occurred to zero (S70) so as to end the process for the moment.

As explained above, according to the present embodiment, in addition to a pair of registration marks that are spaced apart in a paper-width direction, a pair of registration marks that are spaced apart in a paper-conveying direction is further printed on a sheet of paper P on which an image has already been formed. Discharge data is corrected based on a positional relationship between these four registration marks. Therefore, correction is made in response to factors for misalignment caused in a printed image of the sheet of paper P, and a UV ink layer can be formed on the sheet of paper P with high accuracy.

Also, the line heads 64 and the image sensors 60 and 62 are spaced apart at an interval that is larger than the interval between a front registration mark pair and a rear registration mark pair in the paper-conveying direction. Thus, a discharge control process for a front image formation area (see FIG. 15) and a discharge data correction process corresponding to a rear image formation area (see FIG. 14) can be performed simultaneously. As a result, the efficiency of a spot UV printing process can be improved for the entirety of a sheet of paper P.

The plurality of registration mark pairs are arranged at an interval that is relatively small in the paper-conveying direction of the sheet of paper P. Thus, there is an advantage of being able to form the entire ink jet recorder 10 in a compact manner. In other words, as an example for the arrangement configuration of the registration mark pairs, it is also possible to arrange a single pair each only at a front end and a rear end of the sheet of paper P. In that case, correction in response to distortion in the paper-conveying direction can be also made to some degree by reading the position of the single registration mark pair on the front end side of the sheet of paper and the single registration mark pair on the rear end side before the formation of a UV ink layer. Further, distortion in an image and skew in an image can be distinguished from each other. However, it is assumed that there is a case where, since distortion of an image often changes slightly in a paper-conveying direction in recent digital printing, correction in response to the slight change in the distortion is difficult depending on the size of the sheet of paper P. Further, the discharging of a UV ink cannot be started unless registration marks at a front end and registration marks at a rear end of a sheet of paper are read. Thus, if the registration marks are to be read, an interval between a registration mark reading position and a UV ink discharging position needs to be large; therefore, the size of an ink jet recorder may be increased, and a printing process may take a long time. In the present embodiment, a plurality of registration mark pairs are arranged at relatively small intervals; for example, three or more registration mark pairs are arranged in the paper-conveying direction of a sheet of paper P. Thus, these problems can be avoided.

Further, in a correction process for discharge data, when an image formation area is deformed with respect to a design value, the number of nozzles for discharging a UV ink is increased or decreased averagely (almost evenly) in relation to the number of lines in a paper-conveying direction or the number of dots in a paper-width direction in accordance with the deformation of the image formation area. Therefore, even when a printed image is deformed in an expanding or shrinking manner with respect to a design value, influence on the accuracy of spot UV printing given by an error due to the deformation can be minimized In other words, a UV ink can be discharged with high accuracy along the printed image as deformed, and a highly accurate finish can be achieved by spot UV printing.

In the embodiment, an example is shown where a sheet of paper P is conveyed in a normal way along a conveying direction. However, for example, even when the sheet of paper P is tilted, the above-described correction process for discharge data is allowed to function effectively. This is because the above-described coordinate system for a correction process is set with reference to the reading position of the image reader 34 instead of the sheet of paper P itself.

Not only the aforementioned embodiment but the combinations of the elements of the embodiments will also be within the scope of the present invention. Various variations including design variations can be made to the embodiments by those skilled in the art and such variations are also within the scope of the present invention.

In the above embodiment, a configuration is illustrated where an interval between a first registration mark pair located in front in a paper-conveying direction in an image formation area S and a second registration mark pair located in back in the paper-conveying direction (this interval is referred to as an "interval A" for convenience sake) is smaller than a spacing interval between the head unit 36 and the image reader 34 in the paper-conveying direction (this interval is referred to as an "interval B"). In an exemplary variation, discharge data may be able to be corrected even when the interval A is greater than or equal to the interval B.

In that case, for example, processes may be performed as shown in the following. In other words, first, information on which discharge data before correction is based, i.e., information regarding the interval A is acquired in advance from image information stored in the memory unit 76, and whether or not the interval A is greater than or equal to the interval B is determined. If it is determined that the interval A is not greater than or equal to the interval B at this time, a simultaneous parallel process is performed, starting from the first sheet of paper that is fed, where discharge control on a front image formation area in the paper-conveying direction and a correction process for a rear image formation area in the paper-conveying direction are performed simultaneously as in the same way as in the above embodiment.

On the other hand, if it is determined that the interval A is greater than or equal to the interval B, first and second registration mark pairs are read by first allowing at least one sheet of paper to pass without the application of a UV ink. Then, the next sheet of paper is fed. After the first registration mark pair reaches the head unit 36 and before the second registration mark pair reaches the image reader 34, correction is made using read data of the first sheet of paper that has passed earlier. In other words, the tendency of misalignment is estimated based on the position of the registration marks read on the sheet of paper that has passed earlier instead of reading registration marks on a sheet of paper that is subject to ink discharging for making correction. The second registration mark pair is detected afterward as a discharge process of UV ink progresses. The correction of the sheet of paper subject to ink discharging becomes possible at that point. Thus, the correction may be started.

Based on the above descriptions, for example, the following invention is recognized. One embodiment of the present invention relates to an ink jet recorder configured to perform a spot UV printing process, where an ultraviolet curable spot UV printing ink is discharged onto a sheet of paper on which a registration mark that serves as a reference for identifying an image formation position is printed and on which an image has already been formed, such that the spot UV printing is superimposed on the image. This ink jet recorder comprises:

a conveying mechanism that conveys the sheet of paper on which the image has already been formed; a recording head that functions to discharge the spot UV printing ink onto a printing surface of the sheet of paper, on which the image has already been formed; an ultraviolet-ray irradiation unit that is arranged downstream of the recording head in a paper-conveying direction and that cures, by irradiating with an ultraviolet ray, the spot UV printing ink on the sheet of paper; a reader that is arranged upstream, in the paper conveying direction, of the recording head and that reads the registration mark printed on the sheet of paper that is conveyed; a memory unit that stores data that is set in advance, based on a design correspondence relationship, between a printing position of the registration mark and the image formation position in the sheet of paper, wherein the data is discharge data for identifying a discharge pattern of the spot UV printing ink discharged from the recording head; a controller that performs the discharge control of the recording head based on the discharge data; and a correction unit that corrects the discharge data based on information read for the registration mark.

On the sheet of paper on which the image has already been formed, a first registration mark pair and a second registration mark pair are printed. The first registration mark pair and second registration mark pair each consist of a pair of registration marks that are arranged to be spaced apart in a paper-width direction, perpendicular to the paper-conveying direction, the second registration mark pair located posterior to the first registration mark pair in the paper-conveying direction. Based on the actual positional relationship between the first registration mark pair and the second registration mark pair that are read by the reading unit, the correction unit corrects discharge data that corresponds to an image formation area located between the first registration mark pair and the second registration mark pair.

According to this embodiment, in addition to a pair of registration marks that are spaced apart in the paper-width direction, a pair of registration marks that are spaced apart in the paper-conveying direction is further printed on the sheet of paper on which the image has already been formed. The discharge data is corrected based on a positional relationship between these four registration marks. In other words, the correction is made in consideration of both a misalignment in the paper-conveying direction and a misalignment in the paper-width direction in a printed image. Therefore, the correction is made in response to whether the misalignments in the printed image are caused by skew in the sheet of paper or by distortion of the image, and a UV ink layer can be formed with high accuracy on the sheet of paper on which the image has already been formed.

The recording head and the reading unit may be arranged such that the recording head and the reading unit are spaced apart at an interval that is more than an interval between the registration marks that constitute the first registration mark pair and the registration marks that constitute the second registration mark pair in the paper-conveying direction. Such a configuration allows discharge control of a UV ink to be started after the reading of the four registration marks and thus allows the reflection of results of the correction of the discharge data to be ensured from the start of the discharge control.

On the sheet of paper on which the image has already been formed, a third registration mark pair may be further printed that is located posterior to the second registration mark pair in the paper-conveying direction and that consists of a pair of registration marks that are arranged to be spaced apart in the paper-width direction. Then, the correction unit may sequentially perform a first correction, which is a correction on the discharge data that corresponds to a first image formation area located between the first registration mark pair and the second registration mark pair, and a second correction, which is a correction on the discharge data that corresponds to a second image formation area located between the second registration mark pair and the third registration mark pair, and perform the second correction in parallel with the discharge control based on discharge data obtained by the first correction.

According to this embodiment, by allowing discharge control on a front image formation area in the paper-conveying direction and a correction process for a rear image formation area in the paper-conveying direction to be performed simultaneously, the efficiency of a spot UV printing process can be improved for the entirety of a sheet of paper.

The first, second, and third registration mark pairs are set such that the respective positions of each pair of registration marks that are spaced apart in the paper-width direction are the same in the paper-conveying direction in terms of design. The correction unit acquires, as a measured position, the position of a pair of registration marks that constitute each of the registration mark pairs based on information read by the reading unit. The correction unit may correct the discharge data that corresponds to a specific image formation area surrounded by a pair of registration marks that constitute a front registration mark pair in the paper-conveying direction and a pair of registration marks that constitute a rear registration mark pair in the paper-conveying direction based on a difference between a reference position, which is a designed position of each registration mark stored in advance in the memory unit, and a measured position of each registration mark that has been actually acquired.

This embodiment allows an area surrounded by reference positions, i.e., an area that serves as a reference for the correction to be a rectangular area that is parallel in the paper-conveying direction and thus allows a coordinate axis for identifying an image formation position to be easily set in the paper-conveying direction and the paper-width direction. As a result, an arithmetic operation for the correction can be simplified.

The recording head is configured to include nozzles that discharge a UV ink, lined in the paper-width direction. When a specific image formation area surrounded by respective measured positions of the registration marks is deformed with respect to a specific image formation area surrounded by respective reference positions of the registration marks, the correction unit may correct the discharge data so as to averagely increase or decrease the number of nozzles for discharging a UV ink in the recording head in the paper-conveying direction or the paper-width direction in accordance with the deformation of the specific image formation area.

According to this embodiment, even when a printed image is deformed in an expanding or shrinking manner in a paper-conveying direction or a paper-width direction with respect to a design value, influence on the accuracy of spot UV printing given by an error due to the deformation can be minimized In other words, a UV ink can be discharged with high accuracy along the printed image as deformed, and a highly accurate finish can be achieved by spot UV printing.

The memory unit may store position information of the first registration mark pair and position information of the second registration mark pair that correspond to the discharge data stored in advance and information regarding a spacing interval between the recording head and the reading unit in the paper-conveying direction. When an interval between the registration marks that constitute the first registration mark pair and the registration marks that constitute the second registration mark pair is greater than or equal to the spacing interval between the recording head and the reading unit in the paper-conveying direction, the correction unit may perform, without performing a correction of the discharge data for at least a first sheet of paper on which an image has already been formed, a correction of the discharge data for a subsequent sheet of paper on which an image has already formed, based on the actual positional relationship between the first registration mark pair and the second registration mark pair read for the first sheet of paper on which the image has already been formed. When correction is not performed for the first sheet of paper on which the image has already been formed, the control unit may perform, without performing discharge control of the recording head on the first sheet of paper on which the image has already been formed, discharge control of the recording head based on the discharge data as corrected for the subsequent sheet of paper on which the image has already been formed.

What is claimed is:

[1. An ink jet recorder configured to perform an overcoating process, wherein an overcoating ink is discharged onto a sheet of paper on which a registration mark that serves as a reference for identifying an image formation position is printed and on which an image has already been formed, such that the overcoating ink is superimposed on the image, the ink jet recorder comprising:

a conveying mechanism that conveys the sheet of paper on which the image has already been formed;

a recording head that functions to discharge the overcoating ink onto a printing surface of the sheet of paper, on which the image has already been formed;

a reader that is arranged upstream, in a paper-conveying direction, of the recording head and that reads the registration mark printed on the sheet of paper that is conveyed;

a memory unit that stores data that is set in advance, based on a design correspondence relationship between a printing position of the registration mark and the image formation position in the sheet of paper, wherein the data is discharge data for identifying a discharge pattern of the overcoating ink discharged from the recording head;

a controller that performs the discharge control of the recording head based on the discharge data; and a correction unit that corrects the discharge data based on information read for the registration mark, wherein, on the sheet of paper on which the image has already been formed, a first registration mark pair and a second registration mark pair are printed, the first registration mark pair and second registration mark pair each consisting of a pair of registration marks that are arranged to be spaced apart in a paper-width direction perpendicular to the paper-conveying direction, the second registration mark pair located posterior to the first registration mark pair in the paper-conveying direction, and wherein, based on the actual positional relationship between the first registration mark pair and the second registration mark pair that are read by the reading unit, the correction unit corrects discharge data that corresponds to an image formation area located between the first registration mark pair and the second registration mark pair.]

[2. The ink jet recorder according to claim 1, wherein, on the sheet of paper on which the image has already been formed, a third registration mark pair is further printed located posterior to the second registration mark pair in the paper-conveying direction and consisting of a pair of registration marks that are arranged to be spaced apart in the paper-width direction, and wherein the correction unit sequentially performs a first correction, which is a correction on the discharge data that corresponds to a first image formation area located between the first registration mark pair and the second registration mark pair, and a second correction, which is a correction on the discharge data that corresponds to a second image formation area located between the second registration mark pair and the third registration mark pair.]

3. [The ink jet recorder according to claim 2,] *An ink jet recorder configured to perform an overcoating process, wherein an overcoating ink is discharged onto a sheet of paper on which a registration mark that serves as a reference for identifying an image formation position is printed and on which an image has already been formed, such that the overcoating ink is superimposed on the image, the ink jet recorder comprising:*

*a conveying mechanism that conveys the sheet of paper on which the image has already been formed;*

*a recording head that functions to discharge the overcoating ink onto a printing surface of the sheet of paper, on which the image has already been formed;*

*a reader that is arranged upstream, in a paper-conveying direction, of the recording head and that reads the registration mark printed on the sheet of paper that is conveyed;*

*a memory unit that stores data that is set in advance, based on a design correspondence relationship between a printing position of the registration mark and the image formation position in the sheet of paper, wherein the data is discharge data for identifying a discharge pattern of the overcoating ink discharged from the recording head;*

*a controller that performs the discharge control of the recording head based on the discharge data; and*

*a correction unit that corrects the discharge data based on information read for the registration mark,*

*wherein, on the sheet of paper on which the image has already been formed, a first registration mark pair and a second registration mark pair are printed, the first registration mark pair and second registration mark pair each consisting of a pair of registration marks that are arranged to be spaced apart in a paper-width direction perpendicular to the paper-conveying direction, the second registration mark pair located posterior to the first registration mark pair in the paper-conveying direction,*

*wherein, based on the actual positional relationship between the first registration mark pair and the second registration mark pair that are read by the reading unit, the correction unit corrects discharge data that corresponds to an image formation area located between the first registration mark pair and the second registration mark pair,*

*wherein, on the sheet of paper on which the image has already been formed, a third registration mark pair is further printed located posterior to the second registration mark pair in the paper-conveying direction and consisting of a pair of registration marks that are arranged to be spaced apart in the paper-width direction,*

*wherein the correction unit sequentially performs a first correction, which is a correction on the discharge data that corresponds to a first image formation area located between the first registration mark pair and the second registration mark pair, and a second correction, which is a correction on the discharge data that corresponds to a second image formation area located*

*between the second registration mark pair and the third registration mark pair, and* wherein the correction unit performs the second correction in parallel with the discharge control, based on discharge data obtained by the first correction.

4. [The ink jet recorder according to claim 1.] *An ink jet recorder configured to perform an overcoating process, wherein an overcoating ink is discharged onto a sheet of paper on which a registration mark that serves as a reference for identifying an image formation position is printed and on which an image has already been formed, such that the overcoating ink is superimposed on the image, the ink jet recorder comprising:*

*a conveying mechanism that conveys the sheet of paper on which the image has already been formed;*

*a recording head that functions to discharge the overcoating ink onto a printing surface of the sheet of paper, on which the image has already been formed;*

*a reader that is arranged upstream, in a paper-conveying direction, of the recording head and that reads the registration mark printed on the sheet of paper that is conveyed;*

*a memory unit that stores data that is set in advance, based on a design correspondence relationship between a printing position of the registration mark and the image formation position in the sheet of paper, wherein the data is discharge data for identifying a discharge pattern of the overcoating ink discharged from the recording head;*

*a controller that performs the discharge control of the recording head based on the discharge data; and*

*a correction unit that corrects the discharge data based on information read for the registration mark,*

*wherein, on the sheet of paper on which the image has already been formed, a first registration mark pair and a second registration mark pair are printed, the first registration mark pair and second registration mark pair each consisting of a pair of registration marks that are arranged to be spaced apart in a paper-width direction perpendicular to the paper-conveying direction, the second registration mark pair located posterior to the first registration mark pair in the paper-conveying direction,*

*wherein, based on the actual positional relationship between the first registration mark pair and the second registration mark pair that are read by the reading unit, the correction unit corrects discharge data that corresponds to an image formation area located between the first registration mark pair and the second registration mark pair,* wherein the correction unit acquires, as a measured position, the position of a pair of registration marks that constitute each of the registration mark pairs based on information read by the reading unit, and wherein the correction unit corrects the discharge data that corresponds to a specific image formation area surrounded by a pair of registration marks that constitute a front registration mark pair in the paper-conveying direction and a pair of registration marks that constitute a rear registration mark pair in the paper-conveying direction based on a difference between a reference position, which is a designed position of each registration mark stored in advance in the memory unit, and a measured position of each registration mark that has been actually acquired.

5. The ink jet recorder according to claim 4, wherein the recording head is configured to include nozzles that discharge an overcoating ink lined in the paper-width direction, and, when a specific image formation area surrounded by respective measured positions of the registration marks is deformed with respect to a specific image formation area surrounded by respective reference positions of the registration marks, the correction unit corrects the discharge data so as to increase or decrease, on average, the number of nozzles for discharging an overcoating ink in the recording head in the paper-conveying direction or the paper-width direction in accordance with the deformation of the specific image formation area.

6. The ink jet recorder according to claim [1] *4*, wherein the memory unit stores: position information of the first registration mark pair and position information of the second registration mark pair that correspond to the discharge data stored in advance; and information regarding a spacing interval between the recording head and the reading unit in the paper-conveying direction, wherein the correction unit performs, without performing a correction of the discharge data for at least a first sheet of paper on which an image has already been formed, a correction of the discharge data for a subsequent sheet of paper on which an image has already formed, based on the actual positional relationship between the first registration mark pair and the second registration mark pair read for the first sheet of paper on which the image has already been formed, and wherein the controller performs, without performing discharge control of the recording head on the first sheet of paper on which the image has already been formed, discharge control of the recording head based on the discharge data as corrected for the subsequent sheet of paper on which the image has already been formed.

7. The ink jet recorder according to claim 6, wherein, when an interval between the registration marks that constitute the first registration mark pair and the registration marks that constitute the second registration mark pair is greater than or equal to the spacing interval between the recording head and the reading unit in the paper-conveying direction, the correction unit performs, without performing a correction of the discharge data for at least a first sheet of paper on which an image has already been formed, a correction of the discharge data for a subsequent sheet of paper on which an image has already formed, based on the actual positional relationship between the first registration mark pair and the second registration mark pair read for the first sheet of paper on which the image has already been formed.

8. The ink jet recorder according to claim 6, wherein, when correction is not performed for the first sheet of paper on which the image has already been formed, the controller performs, without performing discharge control of the recording head on the first sheet of paper on which the image has already been formed, discharge control of the recording head based on the discharge data as corrected for the subsequent sheet of paper on which the image has already been formed.

9. The ink jet recorder according to claim [1] *4*, wherein the overcoating ink is an ultraviolet curable UV ink.

10. The ink jet recorder according to claim 9, further comprising:

an ultraviolet-ray irradiation unit that is arranged downstream of the recording head in the paper-conveying direction and that cures, by irradiating the sheet of paper that is conveyed with an ultraviolet ray, the UV ink on the sheet of paper.

*11. An ink jet recorder configured to perform an overcoating process, wherein an overcoating ink is discharged onto a sheet of paper on which a registration mark that serves as a reference for identifying an image formation position is printed and, such that the overcoating ink is superimposed on the image, the ink jet recorder comprising:*

*a conveying mechanism that conveys the sheet of paper;*

*a recording head that functions to discharge the overcoating ink onto a printing surface of the sheet of paper;*

*a reader that is arranged upstream, in a paper-conveying direction, of the recording head and that reads the registration mark printed on the sheet of paper that is conveyed;*

*a memory unit that stores data that is set in advance, based on a design correspondence relationship between a printing position of the registration mark and the image formation position in the sheet of paper, wherein the data is discharge data for identifying a discharge pattern of the overcoating ink discharged from the recording head;*

*a controller that performs the discharge control of the recording head based on the discharge data; and*

*a correction unit that corrects the discharge data based on information read for the registration mark,*

*wherein, on the sheet of paper, a first registration mark pair and a second registration mark pair are printed, the first registration mark pair and second registration mark pair each consisting of a pair of registration marks that are arranged to be spaced apart in a paper-width direction perpendicular to the paper-conveying direction, the second registration mark pair located posterior to the first registration mark pair in the paper-conveying direction,*

*wherein, based on the actual positional relationship between the first registration mark pair and the second registration mark pair that are read by the reading unit, the correction unit corrects discharge data that corresponds to an image formation area located between the first registration mark pair and the second registration mark pair,*

*wherein a third registration mark pair is further printed located posterior to the second registration mark pair in the paper-conveying direction and consisting of a pair of registration marks that are arranged to be spaced apart in the paper-width direction,*

*wherein the correction unit sequentially performs a first correction, which is a correction on the discharge data that corresponds to a first image formation area located between the first registration mark pair and the second registration mark pair, and a second correction, which is a correction on the discharge data that corresponds to a second image formation area located between the second registration mark pair and the third registration mark pair, and*

*wherein the correction unit performs the second correction in parallel with the discharge control, based on discharge data obtained by the first correction.*

*12. An ink jet recorder configured to perform an overcoating process, wherein an overcoating ink is discharged onto a sheet of paper on which a registration mark that serves as a reference for identifying an image formation position is printed and, such that the overcoating ink is superimposed on the image, the ink jet recorder comprising:*

*a conveying mechanism that conveys the sheet of paper;*

*a recording head that functions to discharge the overcoating ink onto a printing surface of the sheet of paper;*

*a reader that is arranged upstream, in a paper-conveying direction, of the recording head and that reads the registration mark printed on the sheet of paper that is conveyed;*

*a memory unit that stores data that is set in advance, based on a design correspondence relationship between a printing position of the registration mark and the image formation position in the sheet of paper, wherein the data is discharge data for identifying a discharge pattern of the overcoating ink discharged from the recording head;*

*a controller that performs the discharge control of the recording head based on the discharge data; and*

*a correction unit that corrects the discharge data based on information read for the registration mark,*

*wherein, on the sheet of paper, a first registration mark pair and a second registration mark pair are printed, the first registration mark pair and second registration mark pair each consisting of a pair of registration marks that are arranged to be spaced apart in a paper-width direction perpendicular to the paper-conveying direction, the second registration mark pair located posterior to the first registration mark pair in the paper-conveying direction,*

*wherein, based on the actual positional relationship between the first registration mark pair and the second registration mark pair that are read by the reading unit, the correction unit corrects discharge data that corresponds to an image formation area located between the first registration mark pair and the second registration mark pair,*

*wherein the correction unit acquires, as a measured position, the position of a pair of registration marks that constitute each of the registration mark pairs based on information read by the reading unit, and*

*wherein the correction unit corrects the discharge data that corresponds to a specific image formation area surrounded by a pair of registration marks that constitute a front registration mark pair in the paper-conveying direction and a pair of registration marks that constitute a rear registration mark pair in the paper-conveying direction based on a difference between a reference position, which is a designed position of each registration mark stored in advance in the memory unit, and a measured position of each registration mark that has been actually acquired.*

*13. The ink jet recorder according to claim 12, wherein the recording head is configured to include nozzles that discharge an overcoating ink lined in the paper-width direction, and, when a specific image formation area surrounded by respective measured positions of the registration marks is deformed with respect to a specific image formation area surrounded by respective reference positions of the registration marks, the correction unit corrects the discharge data so as to increase or decrease, on average, the number of nozzles for discharging an overcoating ink in the recording head in the paper-conveying direction or the paper-width direction in accordance with the deformation of the specific image formation area.*

*14. The ink jet recorder according to claim 12, wherein the memory unit stores: position information of the first registration mark pair and position information of the second registration mark pair that correspond to the discharge data stored in advance; and information regarding a*

*spacing interval between the recording head and the reading unit in the paper-conveying direction,*

*wherein the correction unit performs, without performing a correction of the discharge data for at least a first sheet of paper, a correction of the discharge data for a subsequent sheet of paper, based on the actual positional relationship between the first registration mark pair and the second registration mark pair read for the first sheet of paper, and*

*wherein the controller performs, without performing discharge control of the recording head on the first sheet of paper, discharge control of the recording head based on the discharge data as corrected for the subsequent sheet of paper.*

*15. The ink jet recorder according to claim 14, wherein, when an interval between the registration marks that constitute the first registration mark pair and the registration marks that constitute the second registration mark pair is greater than or equal to the spacing interval between the recording head and the reading unit in the paper-conveying direction, the correction unit performs, without performing a correction of the discharge data for at least a first sheet of paper, a correction of the discharge data for a subsequent sheet of paper, based on the actual positional relationship between the first registration mark pair and the second registration mark pair read for the first sheet of paper.*

*16. The ink jet recorder according to claim 14, wherein, when correction is not performed for the first sheet of paper, the controller performs, without performing discharge control of the recording head on the first sheet of paper, discharge control of the recording head based on the discharge data as corrected for the subsequent sheet of paper.*

*17. The ink jet recorder according to claim 12, wherein the overcoating ink is an ultraviolet curable UV ink.*

*18. The ink jet recorder according to claim 17, further comprising:*

*an ultraviolet-ray irradiation unit that is arranged downstream of the recording head in the paper-conveying direction and that cures, by irradiating the sheet of paper that is conveyed with an ultraviolet ray, the UV ink on the sheet of paper.*

*19. An ink jet recorder configured to perform an overcoating process, wherein an overcoating ink is discharged onto a sheet of paper on which a registration mark that serves as a reference for identifying an image formation position is printed, such that the overcoating ink is superimposed on the image, the ink jet recorder comprising:*

*a conveying mechanism that conveys the sheet of paper;*

*a recording head that functions to discharge the overcoating ink onto a printing surface of the sheet of paper;*

*a reader that is arranged upstream, in a paper-conveying direction, of the recording head and that reads the registration mark printed on the sheet of paper that is conveyed;*

*a memory unit that stores data that is set in advance, based on a design correspondence relationship between a printing position of the registration mark and the image formation position in the sheet of paper, wherein the data is discharge data for identifying a discharge pattern of the overcoating ink discharged from the recording head;*

*a controller that performs the discharge control of the recording head based on the discharge data; and*

*a correction unit that corrects the discharge data based on information read for the registration mark,*

*wherein a plurality of the registration marks are printed on the sheet of paper,*

*the correction unit can obtain the position of each of the plurality of the registration marks as a measured position based upon information read by the reader, and*

*the correction unit corrects the discharge data corresponding to the specific image formation area surrounded by the plurality of the registration marks according to differences between a reference position of each of the plurality of the registration marks which is previously stored in the memory unit as a design position and the measured position of each of the registration marks read by the reader,*

*wherein the correction unit sequentially performs a first correction, which is a correction of the discharge data that corresponds to a first image formation area, and a second correction, which is a correction on the discharge data that corresponds to a second image formation area,*

*wherein the first image formation area is in front of the second image formation area in the paper-conveying direction, and*

*wherein the correction unit performs the second correction in parallel with the discharge control based on discharge data obtained by the first correction.*

*20. An ink jet recorder configured to perform an overcoating process, wherein an overcoating ink is discharged onto a sheet of paper on which a registration mark that serves as a reference for identifying an image formation position is printed, such that the overcoating ink is superimposed on the image, the ink jet recorder comprising:*

*a conveying mechanism that conveys the sheet of paper;*

*a recording head that functions to discharge the overcoating ink onto a printing surface of the sheet of paper;*

*a reader that is arranged upstream, in a paper-conveying direction, of the recording head and that reads the registration mark printed on the sheet of paper that is conveyed;*

*a memory unit that stores data that is set in advance, based on a design correspondence relationship between a printing position of the registration mark and the image formation position in the sheet of paper, wherein the data is discharge data for identifying a discharge pattern of the overcoating ink discharged from the recording head;*

*a controller that performs the discharge control of the recording head based on the discharge data; and*

*a correction unit that corrects the discharge data based on information read for the registration mark,*

*wherein a plurality of the registration marks are printed on the sheet of paper,*

*the correction unit can obtain the position of each of the plurality of the registration marks as a measured position based upon information read by the reader, and*

*the correction unit corrects the discharge data corresponding to the specific image formation area surrounded by the plurality of the registration marks according to differences between a reference position of each of the plurality of the registration marks which is previously stored in the memory unit as a design position and the measured position of each of the registration marks read by the reader, and*

*wherein the recording head is configured to include nozzles that discharge an overcoating ink positioned in*

*parallel along the paper-width direction, and, when a specific image formation area surrounded by respective measured positions of the registration marks is deformed with respect to a specific image formation area surrounded by respective reference positions of the registration marks, the correction unit corrects the discharge data so as to increase or decrease, on average, the number of nozzles for discharging an overcoating ink in the recording head in the paper-conveying direction or the paper-width direction in accordance with the deformation of the specific image formation area.*

*21. The ink jet recorder according to claim 19, wherein the memory unit stores, among the plurality of the registration marks which define the specific image formation area corresponding to the discharge data stored in advance, each position information of the registration mark positioned in front in the paper-conveying direction and of the registration mark positioned in back in the paper-conveying direction and information regarding a spacing interval between the recording head and the reader in the paper-conveying direction,*

*wherein the correction unit performs, without performing a correction of the discharge data for at least a first sheet of paper when the distance between the registration mark positioned in front in the paper-conveying direction and the registration mark positioned in back in the paper-conveying direction is greater than or equal to the distance between the recording head and the reader in the paper-conveying direction, a correction of the discharge data for a subsequent sheet of paper, based on an actual positional relationship of the plurality of the registration marks.*

*22. The ink jet recorder according to claim 21, wherein, when correction is not performed for the first sheet of paper, the controller performs, without performing discharge control of the recording head on the first sheet of paper, discharge control of the recording head based on the discharge data as corrected for the subsequent sheet of paper.*

*23. The ink jet recorder according to claim 19, wherein the overcoating ink is an ultraviolet curable UV ink.*

*24. The ink jet recorder according to claim 23, further comprising:*

*an ultraviolet-ray irradiation unit that is arranged downstream of the recording head in the paper-conveying direction and that cures, by irradiating the sheet of paper that is conveyed with an ultraviolet ray, the UV ink on the sheet of paper.*

* * * * *